March 18, 1969  W. F. HUCK ET AL  3,433,479
BOWLING SCORING APPARATUS

Filed Nov. 29, 1965

INVENTORS
WILLIAM F. HUCK
JOSEPH URBAN
BY
Hofgren, Wegner, Allen, Stellman & McCord
ATTORNEYS

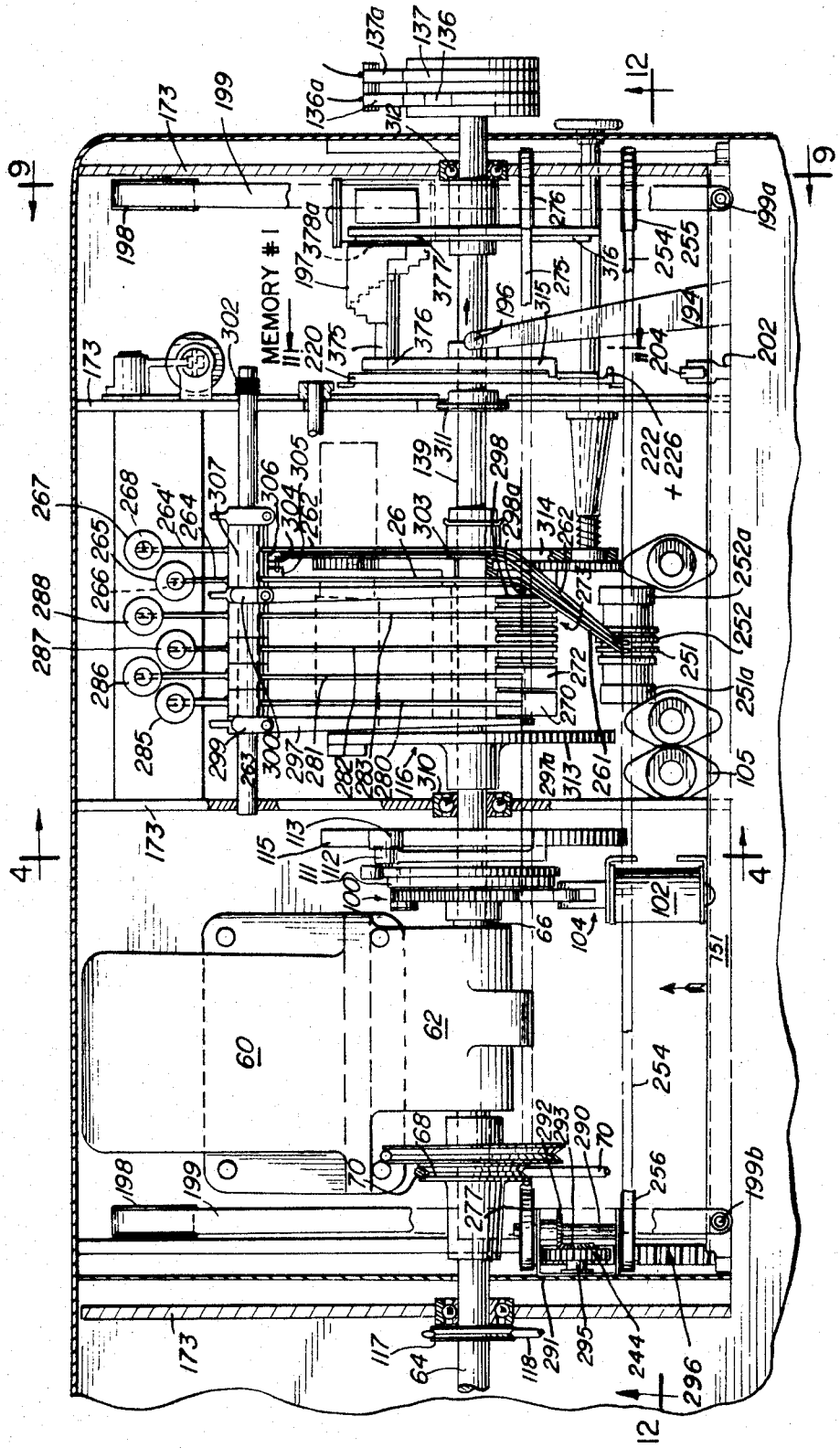

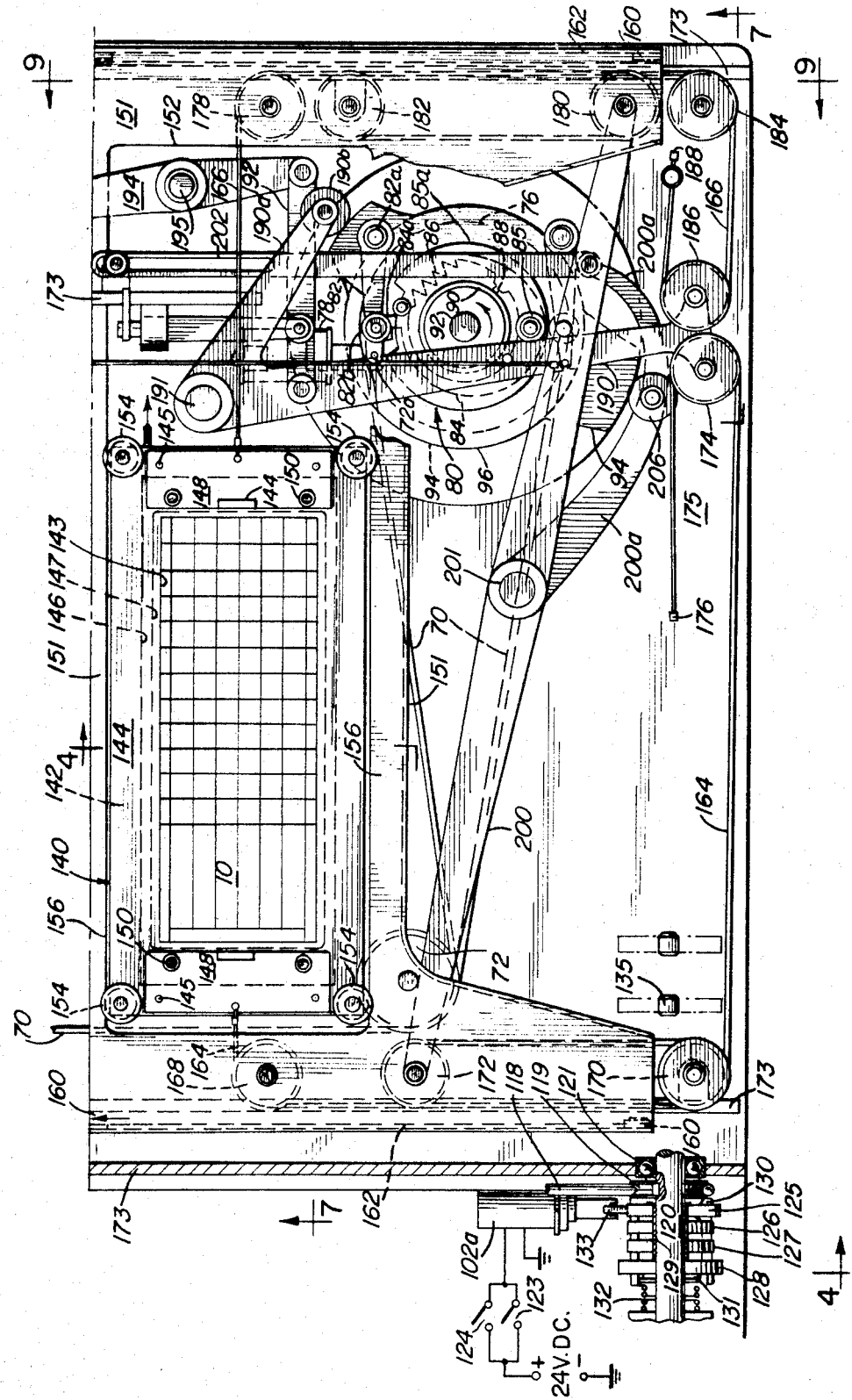

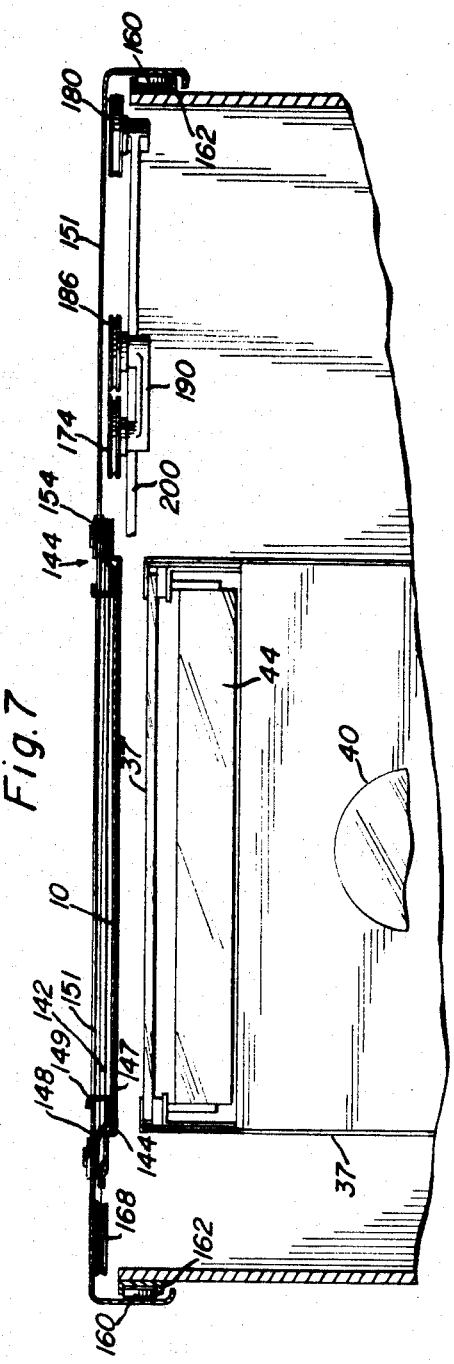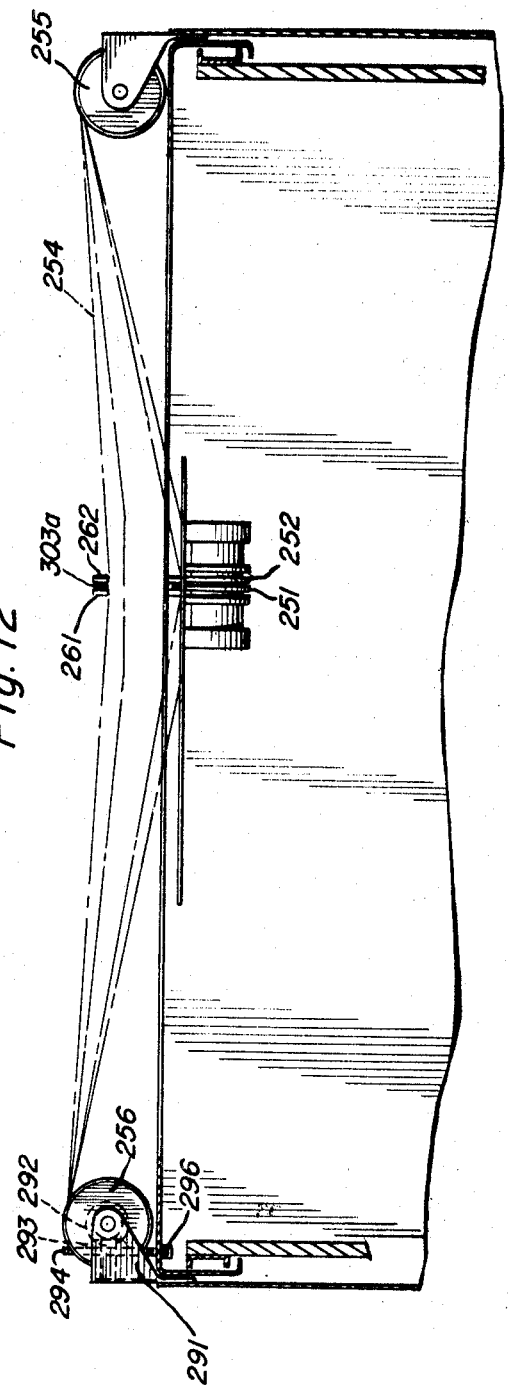

MEMORY #1

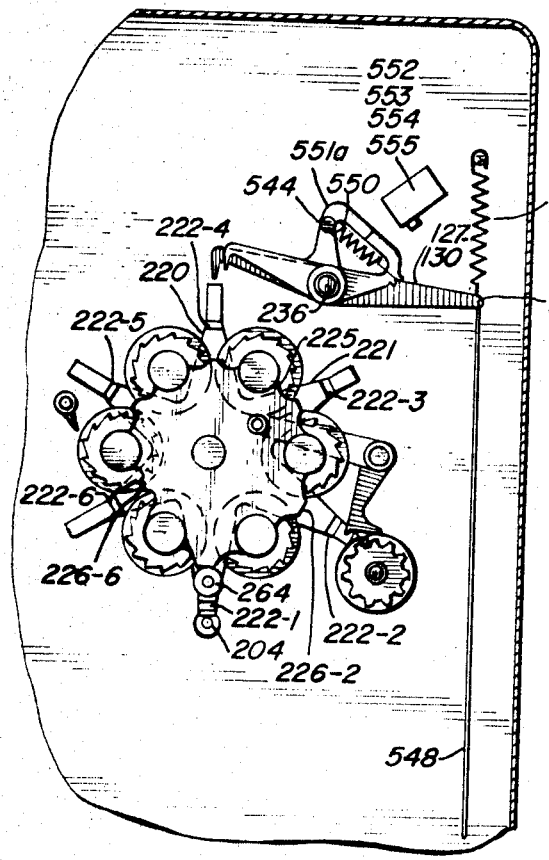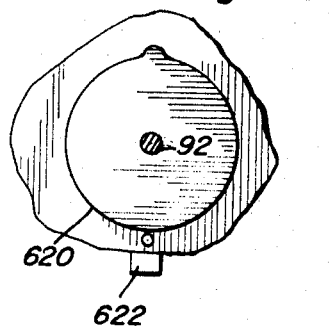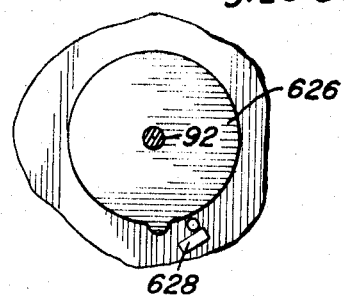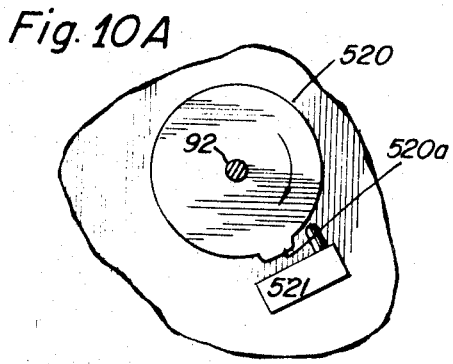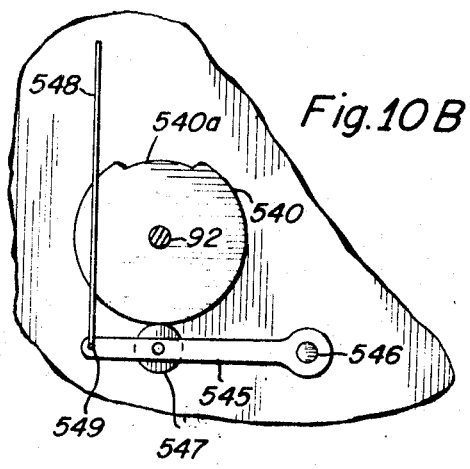

United States Patent Office 3,433,479
Patented Mar. 18, 1969

3,433,479
BOWLING SCORING APPARATUS
William F. Huck, Forest Hills, and Joseph Urban, Pleasantville, N.Y., assignors to Brunswick Corporation, a corporation of Delaware
Filed Nov. 29, 1965, Ser. No. 510,188
U.S. Cl. 273—54    23 Claims
Int. Cl. A63d 5/04

ABSTRACT OF THE DISCLOSURE

A bowling scoring device for scoring bowling games of a plurality of players including a plurality of bowler memories, one for each bowler, mounted on a turret and each having printing means associated therewith; score computing means for utilizing information contained in the bowler memories for computing cumulative score values for each of the bowlers; means for indexing the turret to associate a particular one of the memories with the computing mechanism; and scoresheet supporting means including means for causing relative movement of a scoresheet supported thereby and the printing means on a particular bowler memory towards each other to cause each computed cumulative score to be printed on the scoresheet.

DISCLOSURE

This invention relates to scorers and more particularly to an automatic apparatus for scoring a game of bowling involving one or more players, and as many as six bowlers if desired.

It is a general object of the invention to provide a new and improved scoring apparatus of the type described.

A more specific object is to provide a new and improved apparatus of the type described adapted for using a scoresheet for one or more players, with the sheet normally disposed in a projection position so that an image of scores recorded on the sheet may be optically projected to a suitable viewing screen.

Another object is to provide a new and improved apparatus of the type described in which means is provided for moving the scoresheet from a normal projection position to a printing position for recording bowling score information.

A further object is to provide a new and improved apparatus of the character mentioned in which a complete record of each bowler's performance is kept, including cumulative score and individual ball records, and such information can be displayed throughout the game.

Another object is to provide a scorer having a new and improved printing mechanism for recording scores from a computation mechanism.

It is also an object of the invention to provide a new and improved scorer apparatus including a plurality of individual player accumulators respectively for accumulating the bowler's scores and including wheels having print type for use in printing the bowler's record on the score sheet.

A further object is to provide a new and improved scorer having novel mechanism for moving a scoresheet in two-dimensional directions, x and y directions, from a projection position to properly register the scoresheet in a predetermined one of a plurality of positions which differ from each other in the x and/or y directions.

An additional object is to provide a new and improved apparatus of the type described including an indexable turret structure having a plurality of individual player memory units thereon movable successively to an operative position for receiving bowler pinfall information upon turret indexing.

Another object is to provide a new and improved scorer including a box score print mechanism common to each of a plurality of bowlers.

A further object is to provide in a scorer apparatus new and improved individual bowler memory systems each including a bowler cumulative score accumulator, a mark memory device and a frame memory device as well as scoresheet positioning controls.

An additional object is to provide a new and improved apparatus of the character mentioned in the preceding paragraph in which each bowler's accumulator mechanism includes three 3-wheel accumulators, the leading one of which is aligned with the current bowling frame during score printing.

Another object is to provide a new and improved bowler memory apparatus including team totalizers associated respectively with individual bowler memory sections interconnected so that each previous bowler's score is entered into succeeding bowler team totalizers, the last of which will indicate the team total.

A further object is to provide a new and improved reception and calculation system cooperable with a plurality of individual bowler memory systems, for utilizing at a given time a particular bowler's history, together with his current pinfall information.

Other objects and advantages will become readily apparent from the following detailed description taken in connection with the accompanying drawings, in which.

Figure 6:
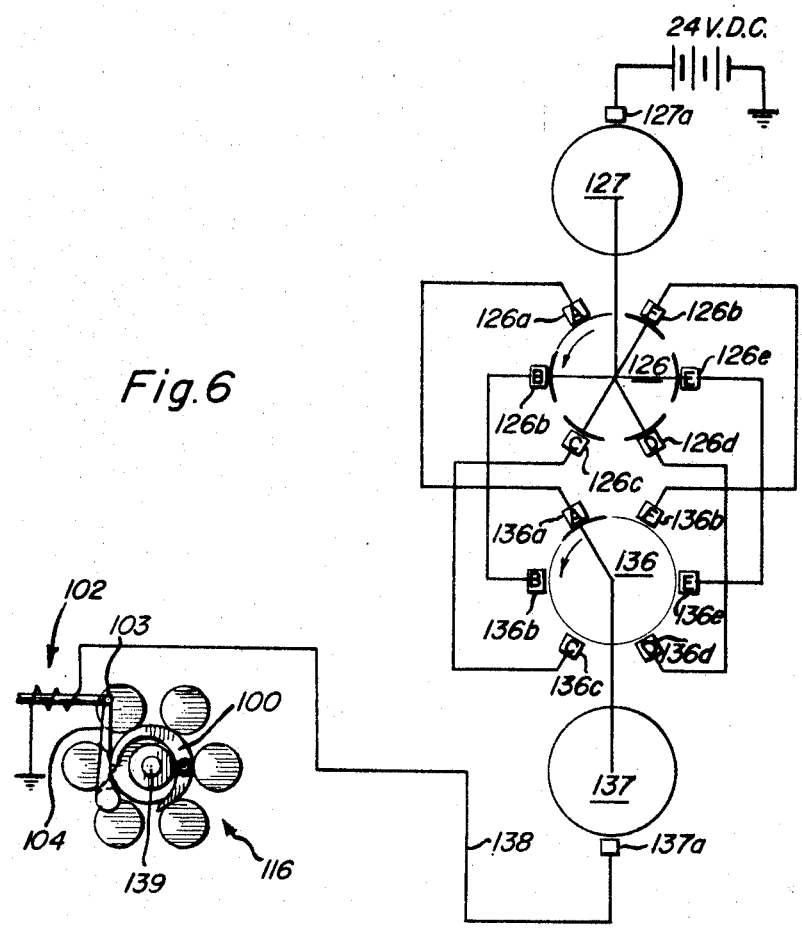
Figure 16:
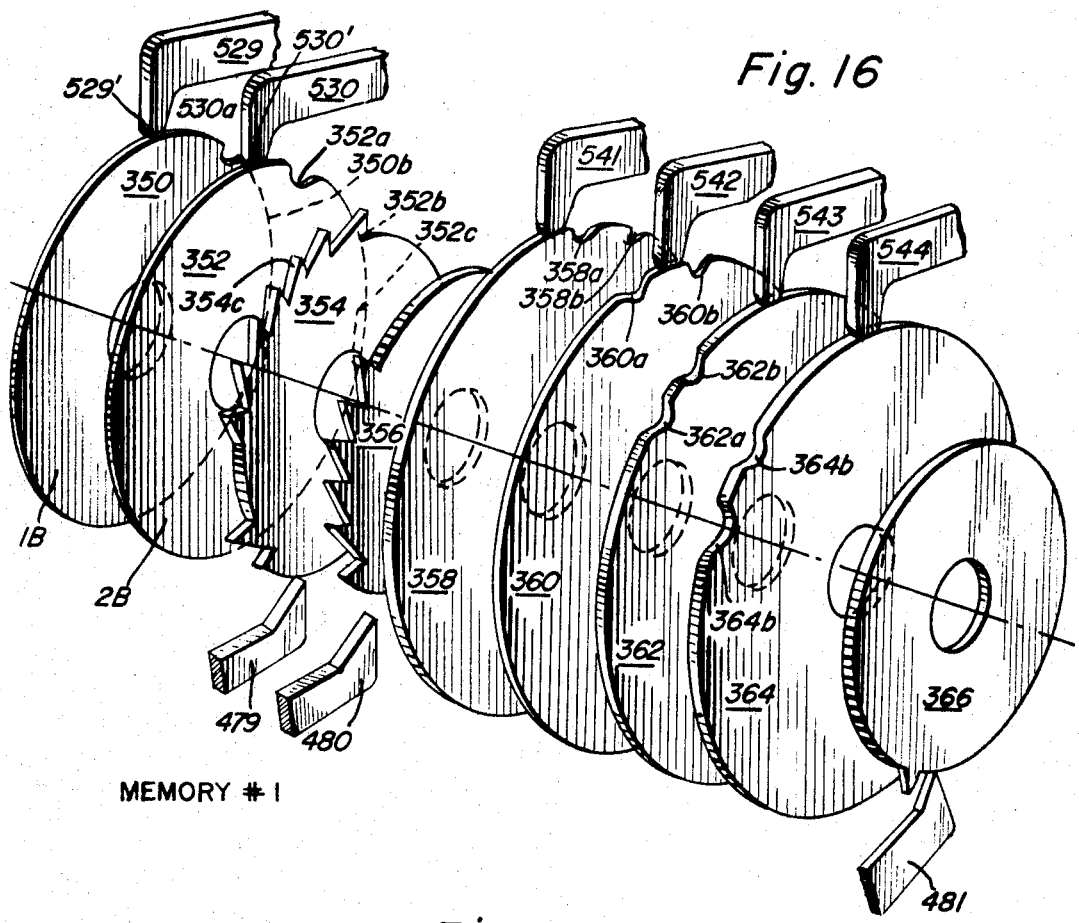
Figure 8:
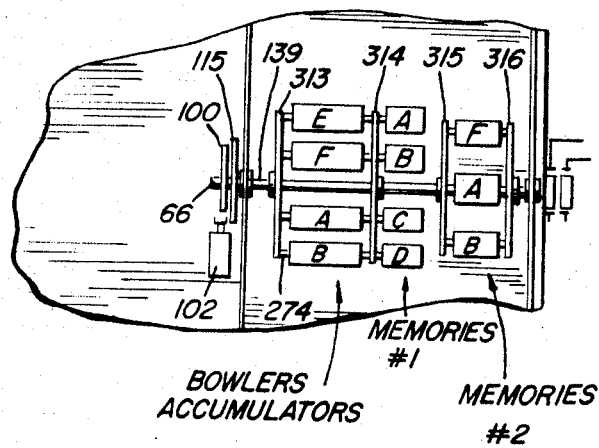
Figure 9:
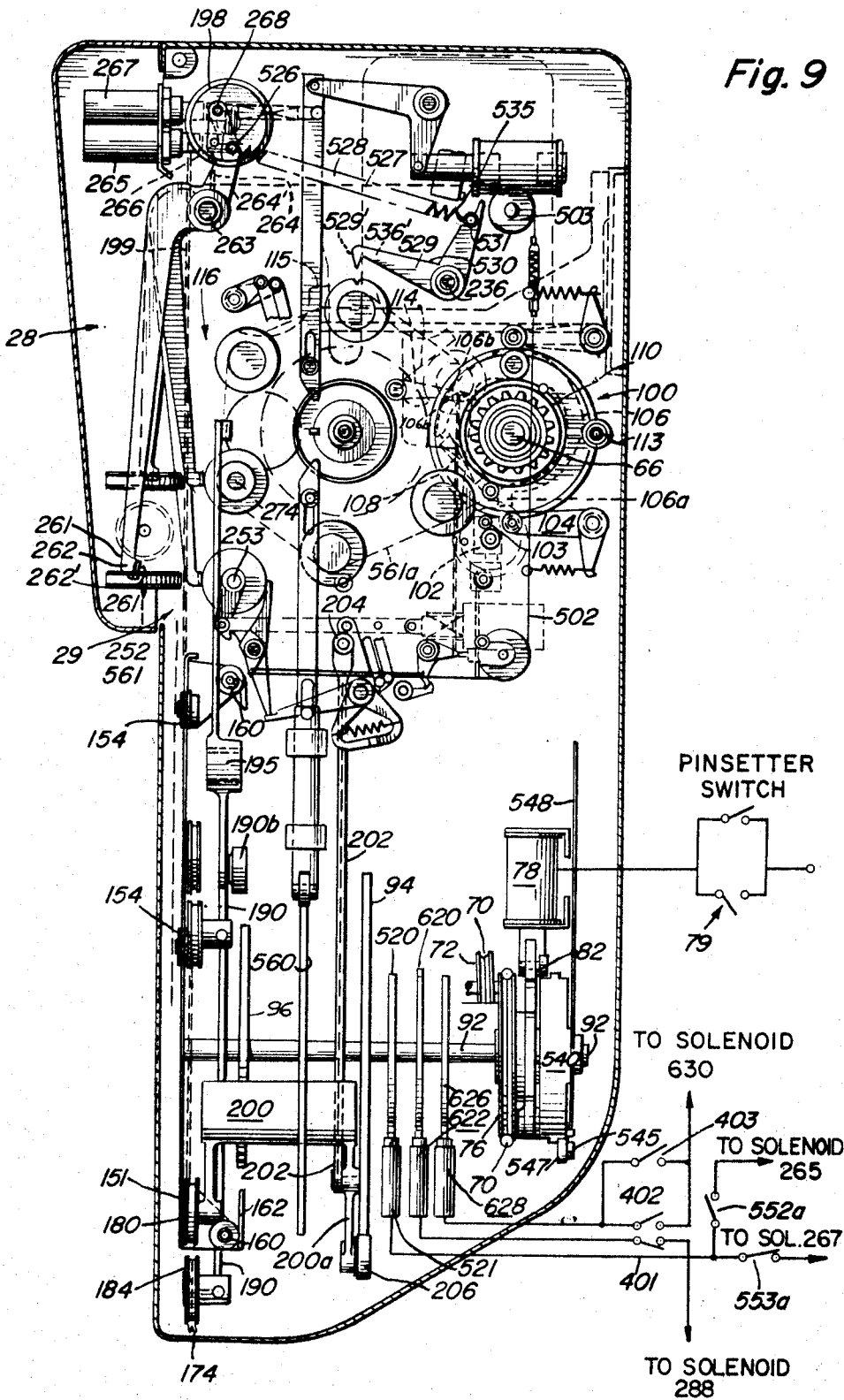
Figure 13A:
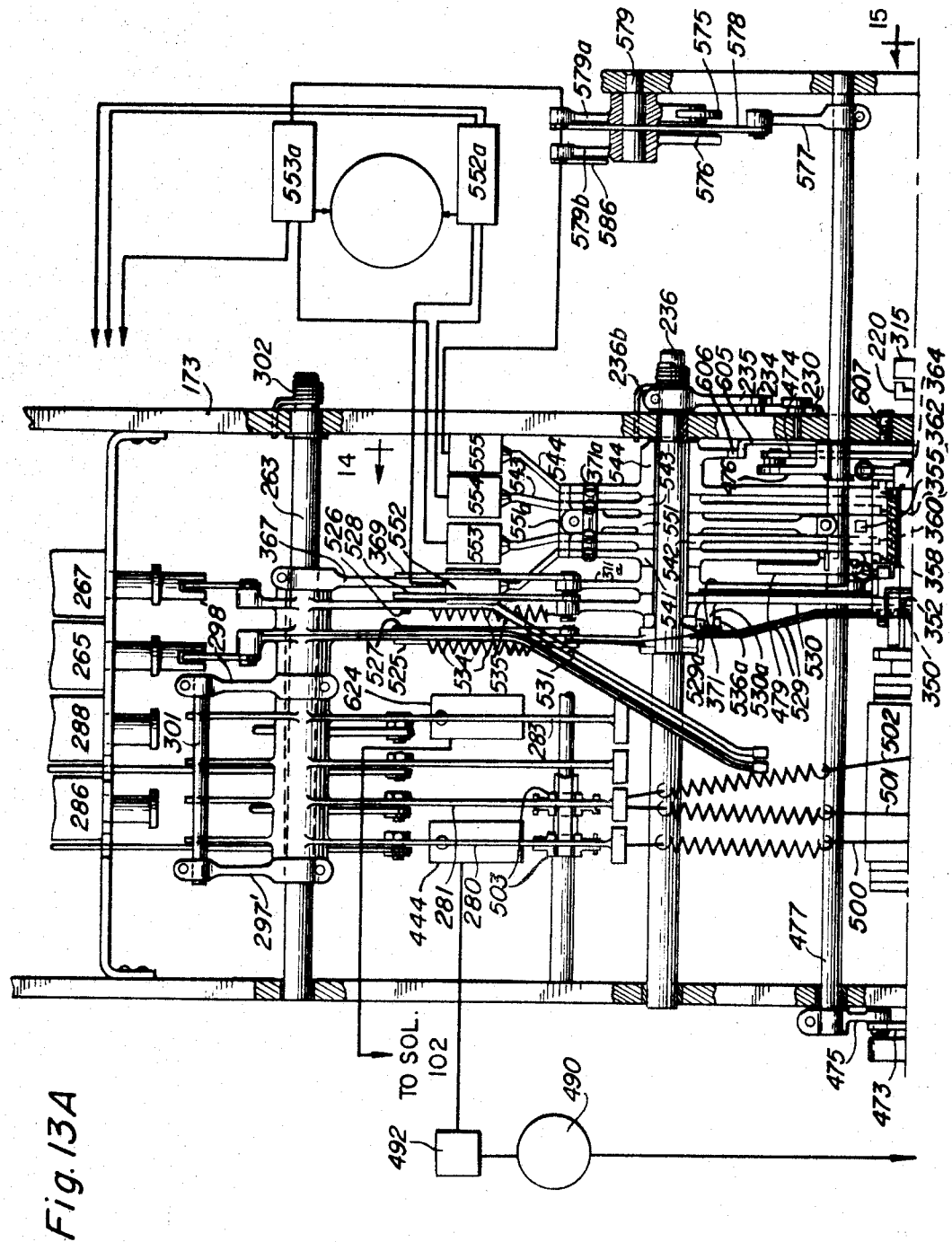
Figure 13B:
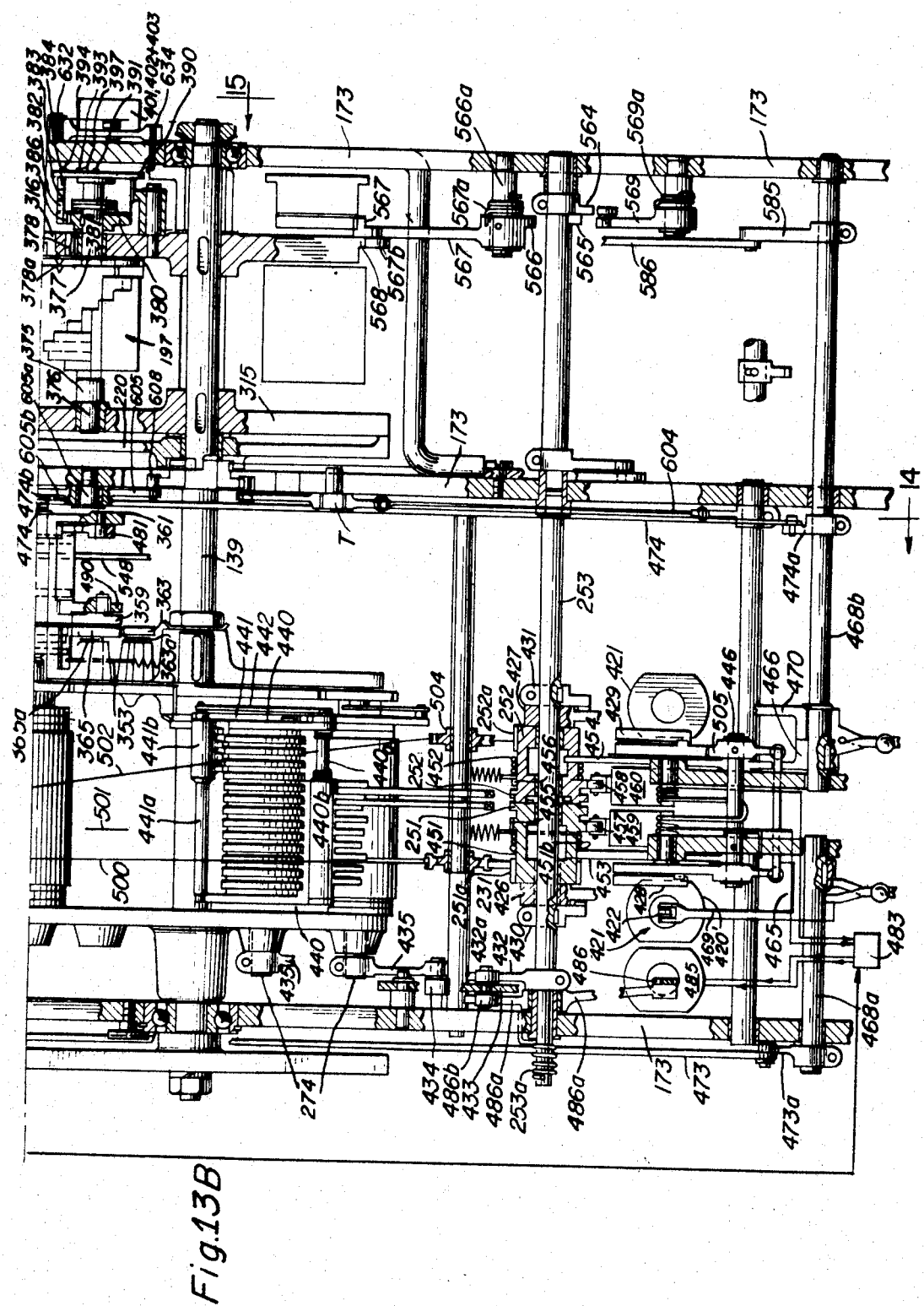
Figure 14:
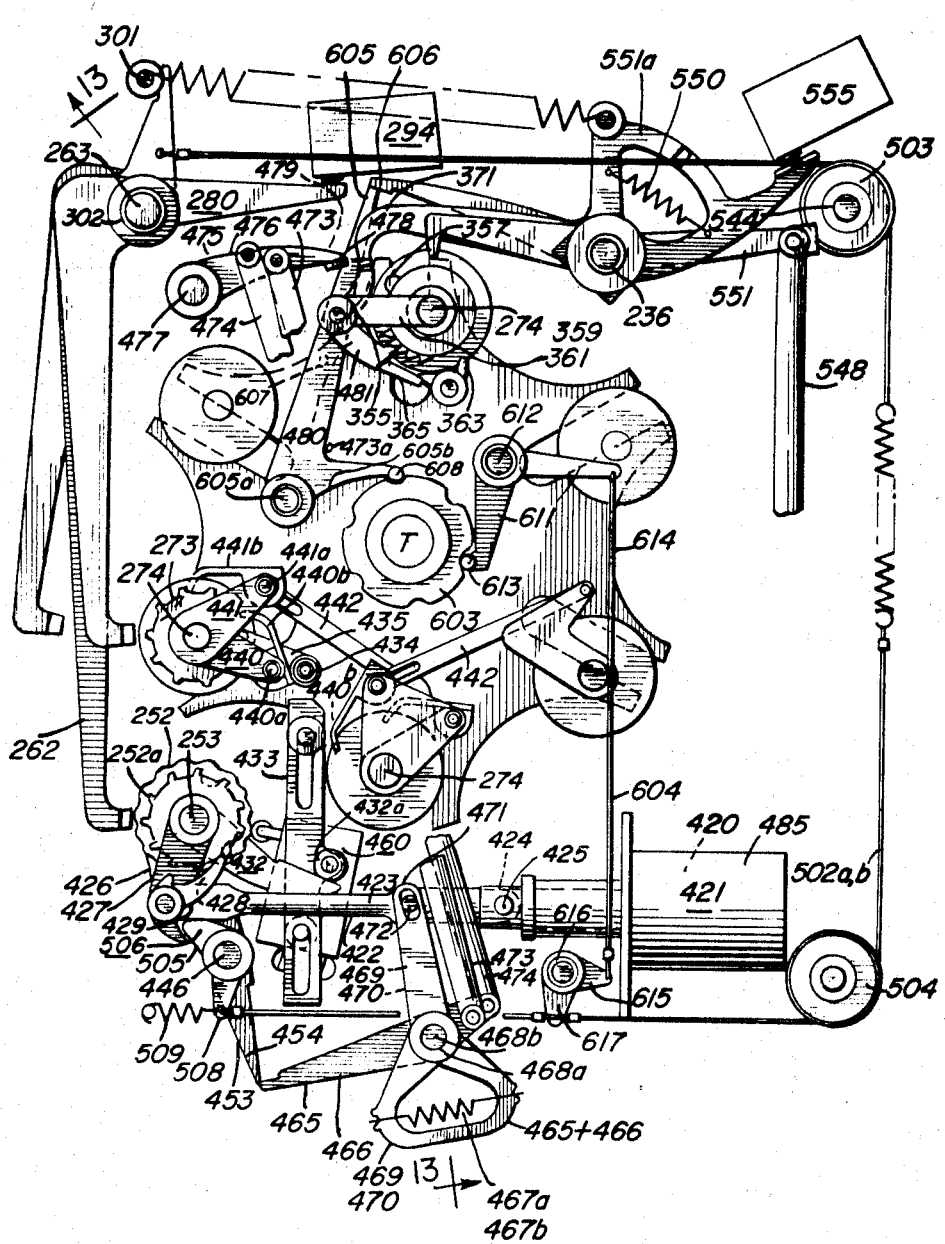
Figure 15:
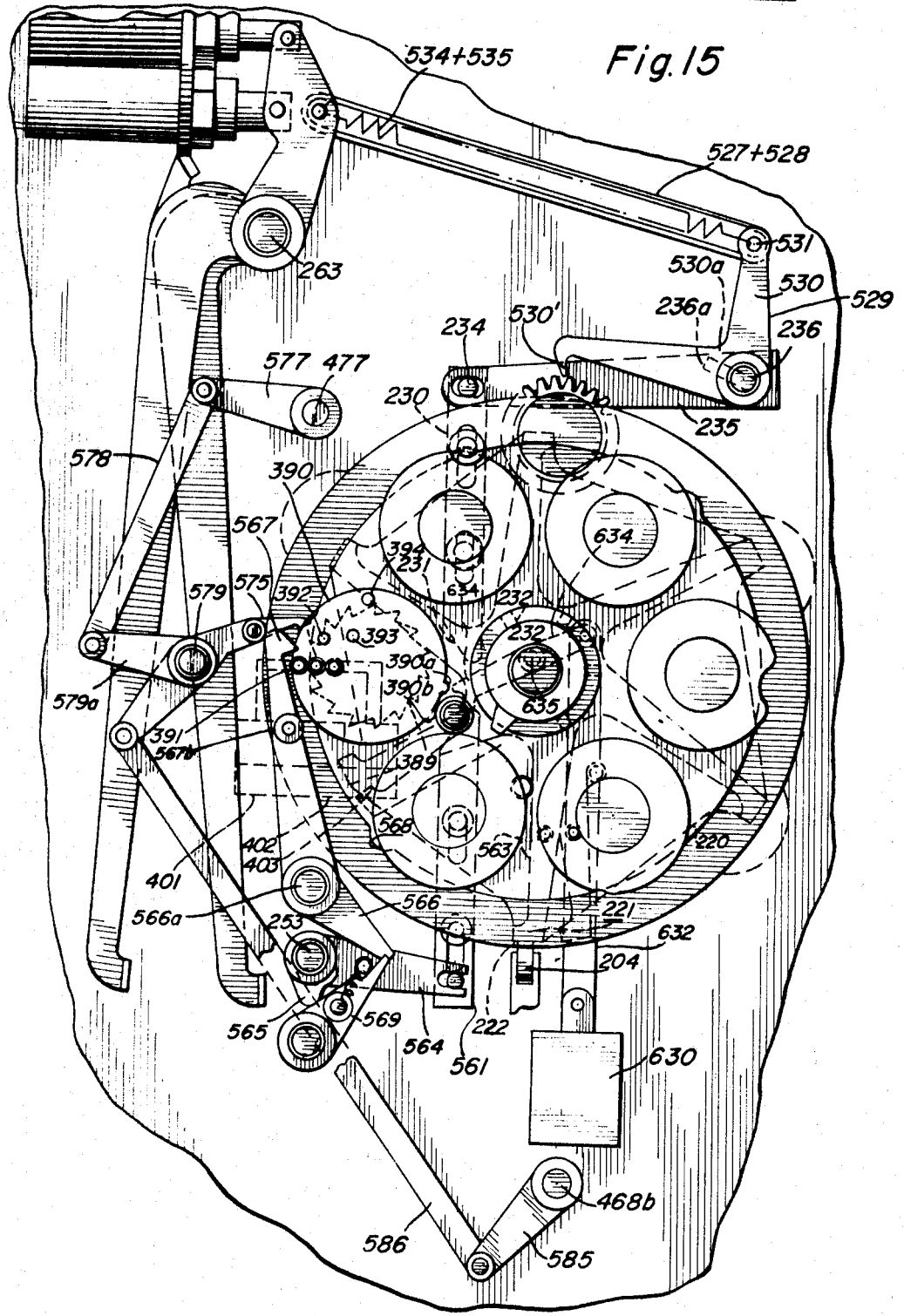

FIGS. 5A and 5B constitute a plan view of a single scorer unit with the cover structure partially removed;

FIG. 6 is a schematic of a turret indexing mechanism in the scorer unit;

FIG. 7 is a fragmentary section along line 7—7 in FIG. 5B;

FIG. 8 is a diagrammatic illustration of a turret assembly in the scorer unit;

FIG. 9 is a fragmentary section through the scorer unit taken at about line 9—9 of FIGS. 5A and 5B, and includes some diagrammatic wiring;

FIGS. 10A, 10B, 10C and 10D are illustrations of control cams and associated elements in the scorer unit;

FIG. 11 is a fragmentary vertical sectional view taken at about the line 11—11 of FIG. 5A;

FIG. 12 is a fragmentary section at about line 12—12 of FIG. 5A illustrating the ink ribbon mechanism associated with the printing apparatus;

FIGS. 13A and 13B constitute an enlarged plan view of the computation mechanism including bowler memories together wtih the reception and calculating mechanism common to several bowlers, shown as an irregular sectional view on line 13—13 in FIG. 14;

FIG. 14 is a vertical sectional view taken at about the line 14—14 of FIGS. 13A and 13B;

FIG. 15 is a vertical sectional view taken at about the line 15—15 of FIGS. 13A and 13B; and FIG. 16 is a perspective showing of a schematic of a memory in the scorer unit.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

IN GENERAL

The present scoring system includes one scorer for each lane to be serviced. Each scorer includes a separate memory system for each of a plurality, e.g., 6, bowlers and a calculating and printing system. The memory system is indexable relative to the calculating and printing system for carrying the appropriate bowler's memory system into working association with the calculating and printing system. Each bowler's memory includes a set of accumulator print wheels which are brought to a print position relative to the calculating and printing system for printing of cumulative score as needed. The accumulator print wheels provide for printing of up to 3 frames of score so that complete printing in back frames is accomplished under mark, i.e., strike or spare, situations.

Each memory also includes a frame memory which is moved into association with the calculating and printing system for controlling movement of a scoresheet or scorecard relative to a pair of print wheels for printing first and second ball score respectively. The ball score wheels are common to all bowlers, and form a part of the calculating and printing system. The scoresheet is also moved relative to the accumulator wheels for printing cumulative score, so that the scoresheet or card is oriented for printing in the proper frame or frames. Each bowler's memory further includes a strike and spare memory which receives and stores information with respect to prior bowler history as to strikes or spares for the last two preceding frames. Information from the strike and spare memory is used to control printing hammers for printing score from the accumulator wheels so that scores can be printed in the present frame, one frame back, and/or two frames back as needed.

The 3 memories for each bowler are carried by a turret which is indexed to present the accumulator print wheels at a print station, the frame memory at a scorecard movement control station, and the strike and spare memory to an information receiving and control station relative to the calculating and printing system, for the next bowler subsequent to assimilation of information from the previous bowler.

The system operates on two separate cycles of operation, one controlling the score calculating and printing system and the other controlling indexing of the turret. The device described herein is timed such that a ball-thrown signal from an automatic pinsetter starts a one-revolution clutch mechanism to initiate cycling of the calculating and printing system. The turret is already in proper position for association with the calculating and printing system. The first portion of the one-revolution clutch cycle is used to position the scorecard relative to the first and second ball print station, guiding on the frame memory. Pinfall signals have been received and the first or second ball print wheels have been indexed to the proper pin count for printing on the scorecard. The commercial pinsetters differentiate between first and second ball in their cyclic operation and are capable of closing limit switches for sending signals as to first and second ball conditions. Thus, separate signals are received from the pinsetter depending on whether a first or second ball condition exists, and such signals are used to properly index the first or second ball print wheel respectively. In the present system, the pin count signals are received in the form of a series of successive pulses, one for each pin down. Such pulses are conventionally provided by a scanner which scans successive contacts in series with pin detection switches.

The score received in the form of pulses from the pinsetter is also added by the calculating and printing system to the accumulator print wheels on a second ball condition or a first ball after a double strike or spare. If a strike or spare is attained, the strike and spare memory is adjusted to reflect the same for determining in which frame cumulative score is to be printed.

The calculating and printing system then prints box score and repositions the card beneath the accumulator wheels for printing any cumulative score which is due to be printed. Any bonus points earned from the bowling of the current frame are then added to the accumulator, the print card is returned away from the print wheels to a project position in a projector system included within the calculating and printing system.

After the pin count information has been received from the pinsetter and assimilated, the pinsetter cycles and a signal is sent during the end of each pinsetter cycle on which a second ball or strike exists, to index the bowler memory turret to position the next bowler's memory system in proper position for scoring. During indexing of the turret, the frame memory is advanced to the next frame.

The scoresheet is normally retained in the projection position and is moved to the print position only when it is necessary to enter score information on the scoresheet, thereby minimizing interruption in projection of the score by the projector on a viewing screen.

Figure 1:
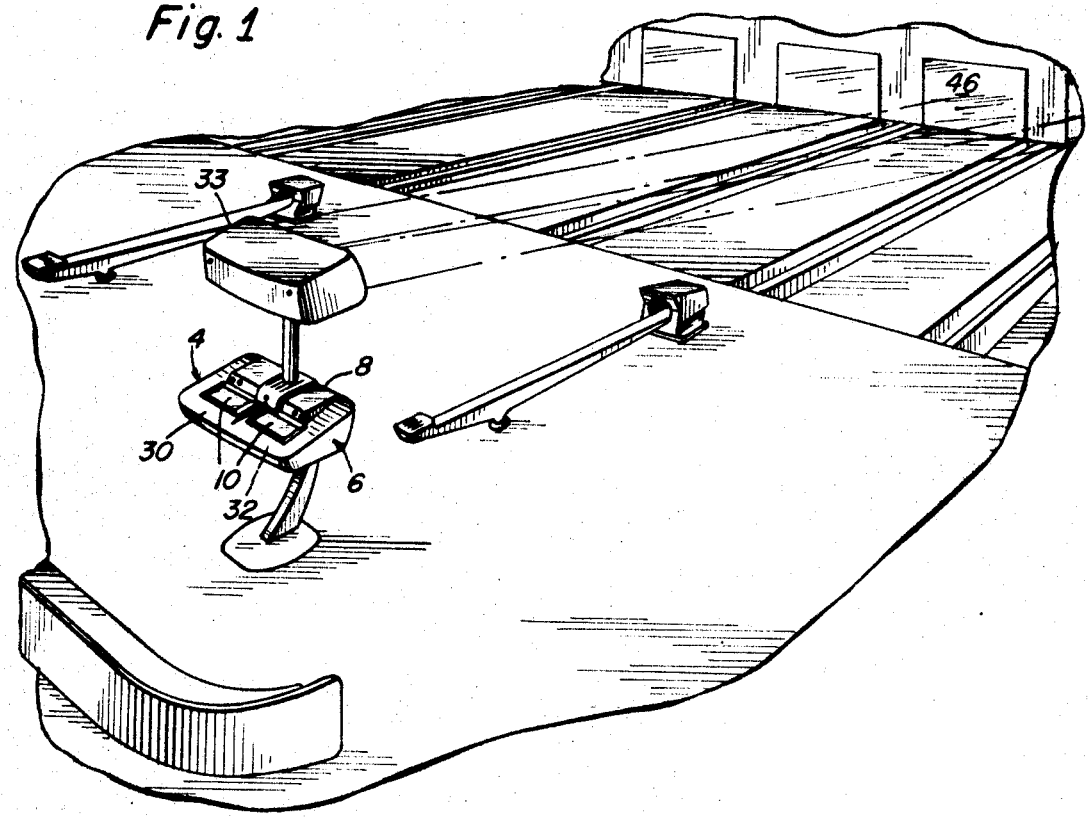
FIG. 1 is a perspective view of a plurality of lanes at a bowling establishment equipped with a bowling scoring system including dual scorer units, each involving the principles of the present invention.

The physical configuration of a preferred apparatus embodying the invention is best shown in FIG. 1 and includes two scorer mechanisms 4 and 6, one for each of a pair of bowling lanes, located in side-by-side positions in a single housing 8. A single scorer mechanism will be considered as constituting a unit for the purpose of this description and since both scorer mechanisms operate similarly, only one will be described hereinafter. A separate scoresheet or card 10 (FIGS. 1 and 2) is associated with each scorer mechanism and located in a generally horizontal plane in a projection position as will be described in detail hereinafter. The cards as shown are in side-by-side relationship.

Figure 2:
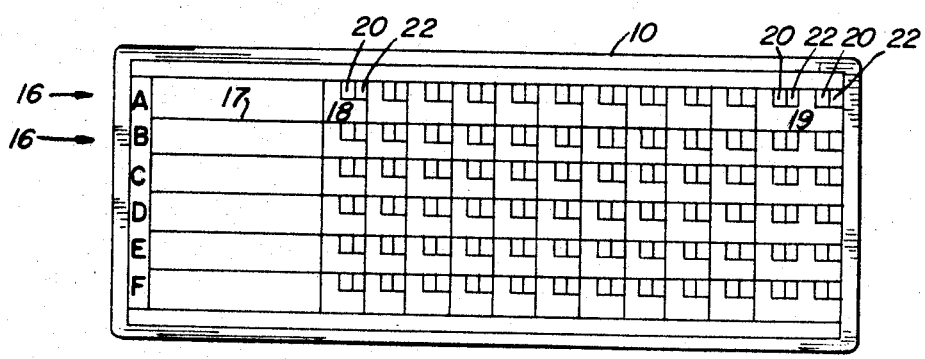
FIG. 2 depicts a scoresheet particularly adapted for use in the apparatus disclosed herein.

An individual transparent or translucent card 10, best shown in FIG. 2, is provided as a scoresheet. Such card includes six lines 16 for bowler identification and score, each including an area 17 for entry of bowlers names, ten areas 18 for indicating the progressive frame-by-frame score and an area 19 for bowlers' totals at the end of the game. Areas 18 each include two small boxes 20 and 22 in the upper right hand corner. Box 20 is used for indicating the first ball results and box 22 for indicating second ball results, i.e. the total results of the two balls. In area 19 there are two sets of boxes 20 and 22 to provide a place for printing box score for an "eleventh" and "twelfth" frame, that is, a bonus obtained in the event a spare or strike in the tenth frame. The far right-hand portion of areas 19 will be used in this system to enter team sub-totals and team total after such information becomes available.

The method of scoring in a bowling gave is well-known in the art, but a brief description may facilitate an understanding of the apparatus. In a standard bowling game the first bowler, A, throws a first ball of each frame at a standard pin set up including ten pins. The total number of pins knocked down, if less than ten, is then recorded in box 20 and the first bowler then throws a second ball; an indication of the total number of pins knocked down, by both the first and second ball, is recorded in box 22. If this total is less than ten, the number is then recorded as in area 18. The other bowlers then follow successively. The first bowler, A, then starts his second turn or frame and the same procedure is followed, except that the total pins knocked down by the two balls of the second frame are added to the first frame score for entry in area 18. This method of scoring is followed except where a foul is committed or all pins are downed with one or both balls.

If a bowler knocks down all the pins with the first ball, this is called a strike and a strike symbol "X" is placed in box 20. This means that the score recorded in area 18 associated with the box 20 having a strike symbol will not be recorded at this time, but will be saved. Ultimately, credit for a total of the number of pins knocked down by the player on his next two balls, plus a bonus of ten, will be reflected in area 18. If the bowler knocks down all the pins with both balls, a spare symbol "/" will be placed in box 22 and after the next ball is bowled by that bowler, i.e. in the next subsequent frame, the number of pins knocked down on such next ball is added into the score along with a bonus of ten and the result is entered into the area 18. The accumulated score is marked in the boxes 18, each score being added to the score preceding it and the total individual bowler's score is recorded in area 19 at the end of each individual bowler line.

A scorer of the type illustrated in the drawings and described in detail hereinafter generally relies on outside sources, such as an automatic pinsetter or other device, for certain information such as a pinfall count, a signal that a ball has been thrown, identification of the ball thrown as a first or a second ball, and strike or spare information. A scorer of the present invention may be used by individual bowlers bowling in succession on a lane or by a team consisting of up to six players. In a dual unit, as shown in FIG. 1, provisions may be made for the teams to switch lanes and for members of the same team to bowl on both lanes at the same time if necessary. Each scorer is able to total and indicate visibly each bowler's complete score record as it occurs throughout the game, as well as team totals and substotals at the end of a game. Provisions are also made for permitting bowlers to bowl out of turn and means may be provided for allowing automatic bowler sequencing. The scorer is reset at the end of each game in preparation for the starting of a new game.

The score of a game is kept on a score card 10 as described and provision is made for normally keeping the card in a projection position and for moving the score card from the projection position, in $x$ and $y$ directions, to a printing mechanism. The printing mechanism prints permanent records on the scorecard of the first ball pinfall, the total pinfall for both balls, marks, the running cumulative and total scores for each bowler, and a team total score at the end of the game. This printed information is projected to a screen for spectator viewing by a projection system indicated generally at 24.

The projection system 24, in housings 8 and 33, includes a light source beneath the scorecard, which operates to project light through the scorecard to a system of mirrors positioned thereabove, which mirrors project the score indications on the scorecard to a display area for viewing by the bowlers and spectators.

The drive system 25 contributes power to operate various systems of the scorer. It consists of a continuously running motor, one for each complete dual unit, a continuously turning shaft, pulleys, belts, and a number of clutches so that this power may be transmitted to the various systems at the proper time in order to permit the movements necessary in the operation of the scorer.

The card supporting and handling system, generally indicated at 26, comprises means to support the scorecard and means such as carriages, pulleys, rollers, cables and tracks to permit movement of the score card in $x$ (left to right) and $y$ (up and down on the sheet) directions from the projection position to a printing position. The score is placed on the scorecard in the printing position and the card is then moved back to the projection position. As various scores, such as the first ball pinfall, the second ball pinfall (total first and second ball pinfall), the accumulated individual bowler's score (frame and individual bowler's total), and the team substotal and total are placed in specific areas on the scorecard, the card supporting and handling system must place the card in its proper position so that the score indications will be printed in the proper boxes and areas on the card as was described hereinabove.

The printing system, generally indicated at 27, includes print hammers and ink ribbons which cooperate with accumulator wheels having print-type numbers thereon in a memory system. On reception of the proper signal, as will be discussed in detail hereinafter, solenoids in the printing system are actuated, theerby causing the print hammers and accumulator wheels to print the score indications on the score card so as to create a visible record thereof.

The memory system, generally indicated at 28, which includes an indexable turret, stores the accumulated bowling records in accumulators having print-type number wheels. The turret includes six separate rows of player number wheel accumulators—each with three 3-wheel accumulators for a frame score and a 4-wheel accumulator for running team sub-totals and totals, a strike-spare memory unit, a frame memory wheel, and a scorecard positioning control to coordinate the proper score card position with the proper bowlers' accumulators. Geneva motion means is provided to index the turret to successively register player units with a reception and calculating system.

The reception and calculating system, generally indicated at 29, in turn receives each player's memory information, or history, and pinfall information and computes a new score and history. This information is then passed to the memory section for storage, printing and display at the proper time. The reception and calculating system includes solenoid type unit infeeds for first and second balls, first and second ball box score print wheels, and various linkages and mechanisms to feed the bowler score inputs to the memories and accumulators.

THE PROJECTION SYSTEM

Two projection systems are provided, one for each scorecard 10, and each is identical to the other; only one will be described in detail hereinafter.

Single housing 8 contains the two projectors 30 and 32 of the projection system (FIGS. 1, 3 and 4) and single housing 33 contains suitable reflecting mirrors and/or lenses of a type well known in the art for directing images from both projectors to viewing screens 46.

Figure 3:
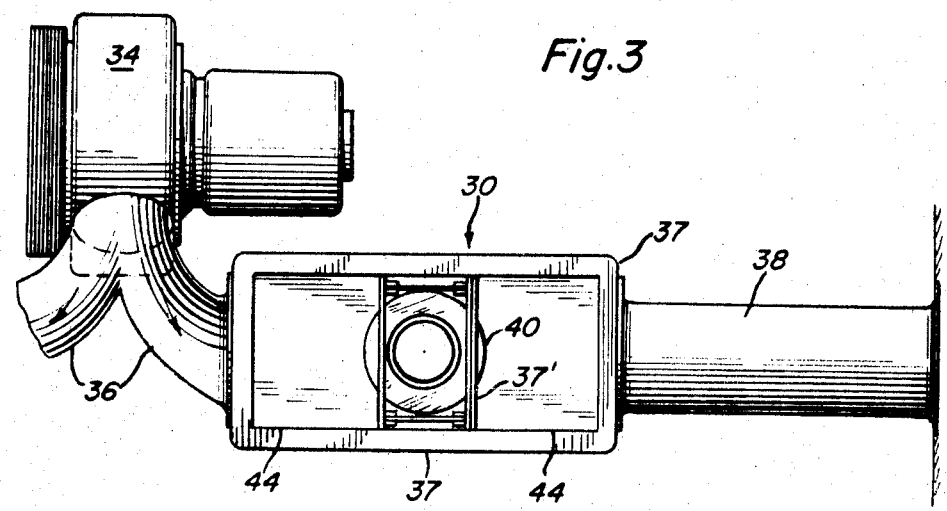
FIG. 3 is a fragmentary plan illustrating the disposition of portions of a pair of projection systems associated with the dual scorer units.
Figure 4:
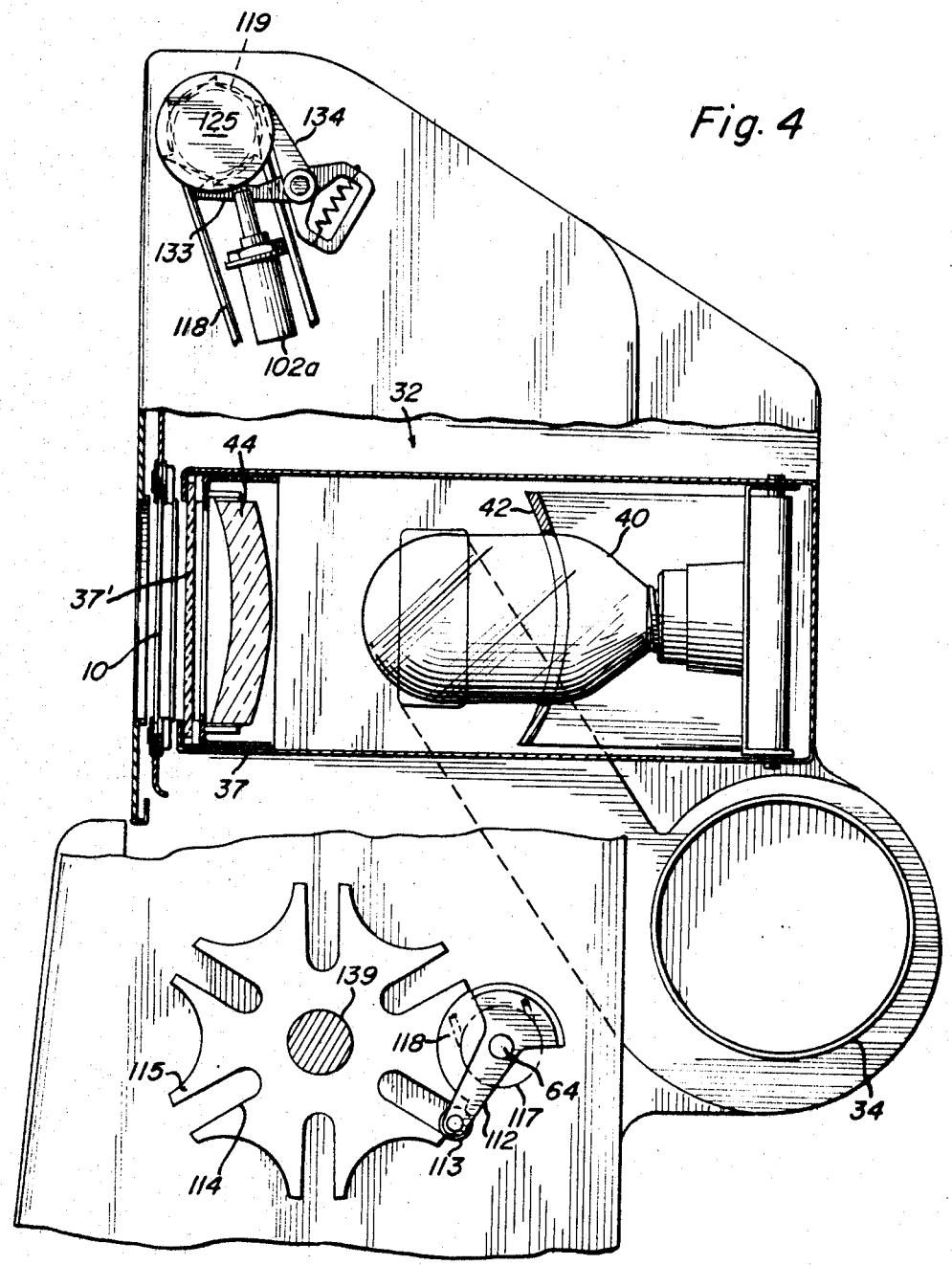
FIG. 4 is a vertical section taken through the systems of FIG. 3 at about the line 4—4 of FIGS. 5A and 5B.

In FIG. 3, a blower 34 in housing 8 is connected as by air ducts 36 for supplying cooling air to a casing 37 of each projector 30 and 32. Each casing 37 includes a glass cover 37' registering with an opening in the top of housing 8. Each casing 37 is vented by duct 38 to provide for cooling air circulation from the blower and to prevent overheating in casing 37. As best shown in FIG. 4, each individual projection system comprises a lamp 40, a reflector 42 and a lens 44 positioned beneath the projection position of the card 10. Thus, in order to display the bowlers' scores carried on the card 10, the card 10 is positioned above the lighted lamp 40. The light of lamp 40 is reflected upwardly by reflector 42, through lens 44, through the transparent card 10, and reflected off the mirrors in the upper unit 33 onto a display board or viewing screen 46 mounted and supported from the ceiling of the bowling establishment.

THE DRIVE SYSTEM

The drive system, as shown in FIGS. 5A and 5B comprises a motor 60 which is continuously running while the scorer is operating. A gear box 62 is attached to and driven by motor. Gear box 62 drives shafts 64 and 66 extending from gear box 62 in opposite directions.

In order to provide power for the card positioning mechanism, a pulley 68 is attached to shaft 64. Passing over pulley 68 is an endless cable or belt 70, of circular cross-section, which travels around horizontally disposed pulley 72 (FIGS. 5B and 9), pulley 76, back around an idler pulley disposed beneath pulley 72 and back to pulley 68. This drive causes pulley 76 to continuously rotate counterclockwise as viewed in FIG. 5B at all times when the motor is running, i.e. at all times when the scorer is turned on. The power for the card positioning system is taken from pulley 76 in response to a ball-thrown signal from an outside source (i.e. the pinsetter) which pulls in a solenoid 78 to release a card positioning, one-revolution clutch 80. A manual switch 79 (FIG. 9) is also provided for this purpose. Clutch 80 includes a driving toothed wheel 90 attached to and rotating with continuously rotating pulley 76 and a driven pawl member 84 pivoted at 85 on a carrier cam 85a fixed to and rotatable with a shaft 92 on which pulley 76 and toothed wheel 90 rotate. Pawl 84 includes a tooth 88 engageable with the teeth on wheel 90 and is normally biased toward the wheel by a spring 86. During the periods of inactivity, the pawl 84, which includes an end piece 84a, is held by a latch member 82 pivoted at 82a so that the pawl tooth 88 is disengaged from the toothed wheel 90 and the pawl carrier 85a is held against rotation. In operation, the one-revolution clutch is activated upon energization of solenoid 78 which, through a connection at 72a, pulls latch 82 away from pawl end 84a allowing spring 86 to bring pawl tooth 88 into engagement with multi-toothed wheel 90 attached to continuously revolving pulley 76 rotating on shaft 92. With the pawl 84 engaged, shaft 92 rotates, driving cams 94 and 96 fixed on shaft 92. These cams, in conjunction with stops in the memory section, position the score card for printing as will be later described in detail. Roller 82b rides on carrier 85a when solenoid 78 is deactivated during the one revolution. At the end of the one revolution, roller 82b falls into low 85b and latch 82 relatches pawl 84 and disengages pawl 84 from wheel 90, thereby disengaging the clutch.

On the right-hand side of gear box 62 (FIG. 5A), shaft 66 drives a turret-indexing, one-revolution clutch 100, which is engaged by actuation of a solenoid 102 (FIGS. 5A and 9) to index a turret 116 for one-sixth of a revolution. The memory system is carried by the turret 116 and thereby indexed to present the next player's memory components at various input and output stations. Solenoid 102 is connected to latch 104 at 103, and pulls and disengages latch 104 from pawl end 106a. Pawl 106 is pivotally mounted on a pawl carrier 111 and, when disengaged, pivots under bias of spring 108 to a position with a tooth 106b of pawl 106 in engagement with a gear 110 fixed on constantly rotating shaft 66. When gear 110 is engaged by pawl 106, pawl carrier 111 is driven, and attached Geneva crank arm 112 (FIGS. 4 and 5A) is rotated, one revolution. Crank arm 112 carries a drive roller 113 engageable with radial drive slots 114 in Geneva wheel 115 which is fixed to shaft 139 of turret 116 carrying the player memory units in the memory section. One revolution of pawl 106 before it is disengaged indexes the turret one-sixth revolution to advance one player memory unit from registry with the calculating system and another unit into registry as described in more detail hereinafter.

A pulley 117 (FIGS. 4 and 5A) is affixed to constantly turning shaft 64 and drives a belt 118. Belt 118 passes around and drives a pulley 119 (FIGS. 4 and 5B) on a shaft 120, mounted as in bearings 121 and 122, so that shaft 120 is constantly turning along with shaft 64.

Also mounted on shaft 120 are a ratchet wheel 125 having six equally spaced teeth, a switch rotor 126, a continuous slip ring 127 and an indicating disc 128 having the bowler's identification marked thereon, i.e. Bowler A through F. These parts are rotatably mounted on shaft 120 as by a bushing 129. Parts 125–128 are normally held against rotation by an escapement arm 133 operated by a solenoid 102a, but, when released, can all rotate together. Parts 125–128, for rotation, are driven from pulley 119 through a friction drive ring 130.

In operation, as best shown in FIG. 5B, an input signal activates solenoid 102a to raise escapement arm 133 from ratchet wheel 125. Spring 132, biasing against members 125–128, holds friction ring 130 against pulley 119. This causes the ratchet wheel 125 to be driven in a clockwise direction (FIG. 4) one-sixth of a revolution until a stop arm 134 contacts the next tooth on ratchet wheel 125 and changes the bowler's designation by also driving disc 128 one-sixth of a revolution.

The signal to operate solenoid 102a (FIG. 5B) may come from either of two places: a switch 123 closed by cycling of the automatic pinsetter, e.g. toward the end of each APS cycle, or a manual index switch 124 mounted on the scorer cabinet and operated manually when it is desired to index the turret other than automatically.

As best shown in FIG. 6, the mechanism just described cooperates with a discontinuous switch wiper 136 and a continuous slip ring 137 driven by shaft 139 with turret 116. These members provide for automatic sequencing of the turret 116. When a signal to index the turret 116 activates solenoid 102a and thereby indexes ratchet wheel 125 as described hereinabove, switch rotor 126 and ring 127 are also indexed one-sixth of a revolution. A brush 127a connected to a source of power carries a current through ring 127, and through an internal connection to rotor 126. Six brushes, 126a through f, contact rotor 126 which has five discontinuous conductive segments internally wired as shown in FIG. 6, leaving one nonconducting segment.

The wiper 136 and ring 137 are connected in a similar manner with ring 137 contacting a brush 137a and wiper 136 engageable with six brushes 136a through f respectively. A wire 138 connects turret index solenoid 102 and brush 137a. Wiper 136 includes only one conducting segment thereon which successively passes beneath brushes 136a through f.

Therefore, when solenoid 102a receives an indexing signal, ratchet wheel 125 is allowed to rotate one-sixth of a revolution. Thus current is flowing from brush 127a, through ring 127 and through rotor 126 at five separate contacts. In the example shown in FIG. 6, brush 126a has no current flowing thereto. However when rotor 126 rotates one-sixth of a revolution clockwise, current will be supplied to brush 126a and thus completes the circuit to 136a which is on the conducting segment portion of wiper 136. Therefore a completed circuit will be made through wiper 136 to ring 137, and the current will then be taken from ring 137 by brush 137a, carried through line 138 to the turret indexing solenoid 102, and thereby index the turret 116 a nd its shaft 139 on which members 136 and 137 are carried. One of the bowler memories on turret 116 is carried to score entry position. By indexing shaft 139, wiper 136 is indexed clockwise one-sixth of a revolution to place the conducting segment thereof beneath brush 136b. This now forms an open circuit since the open contact on rotor 126 is beneath brush 126b as described hereinabove and the turret will dwell in this position until another indexing signal is received at solenoid 102a thereby indexing a conducting segment on rotor 126 under brush 126b. The indexing action as described above then repeats to carry the next bowler's memory into score entry position.

SCORECARD SUPPORT AND HANDLING SYSTEM

As shown in FIGS. 5A and 5B, scorecard 10 is suitably mounted on a movable carriage 140 for moving the card between a normal or home projection position and a second or printing position. The card is held on the carriage adjacent its perimeter so that the entire record area thereon is exposed at both card surfaces for projection of the record and for purposes of being printed upon as by a print hammer while suitably backed by a print wheel. Referring particularly to FIGS. 5B and 7, the carriage 140 comprises a substantially planar plate 142 of rectangular outline having a rectangular central aperture 143 of a size corresponding substantially to the size of the scorecard 10. Secured under and to the plate 142 is a card holder 144 in the form of a thin metal plate having its perimeter suitably secured to the perimeter of plate 142. Card holder 144 is formed with a rectangular depression 146 to provide a central sunken receptacle for the card. The plate 144 also has a central rectangular aperture 147 in sunken portion 146 so that the card is uncovered on both sides for purposes of printing and projection.

The card is suitably retained in place by overlying clamp means 148 at opposite ends thereof, each in the form of a spring metal clip or plate suitably secured to the carriage plate 142 and having an upwardly projecting tab as at 149 to facilitate manual manipulation of the clamp to insert and remove the card ends therebeneath. Preferably, the card is formed with a pair of apertures at opposite ends and is held in position and somewhat tensioned by means of fastening devices as at 150 attached to the clamp 148 and positioned through the card apertures and the receptacle 146.

Carriage 140 is mounted for reciprocal movement in an $x$ direction (left and right in FIG. 5B) on a carriage 151, which is in turn mounted for reciprocal movement in a $y$ direction (up and down in FIGS. 5A and 5B). Carriage 151 comprises a generally planar plate having a relatively large rectangular aperture 152 for mounting carriage 140 by rollers 154 rotatably mounted on carriage 140 at the four corners thereof and flanged to embrace and move on tracks 156 provided by opposite edges of the aperture 152. Carriage 151 has rotatably mounted rollers 160 at the four corners thereof which travel in tracks 162.

A cable 164 is connected to the left-hand side of carriage 140 (FIG. 5B) and passes 90 degrees around pulley 168 mounted on carriage 151, tangentially past pulley 172 on carriage 151, 180 degrees around pulley 70 on frame 173, 180 degrees around movably supported pulley 172, 90 degrees around pulley 170, 180 degrees around movably mounted pulley 174 on an $x$-arm 190, and is anchored at the other end to casing wall 175 as at 176. Another cable 166 is connected to the right-hand end of the carriage 140 and passes in like manner around pulley 178 on carriage 151, pulley 182 on frame 173, pulley 180 on carriage 151, pulley 182, pulley 180, pulley 184 on frame 173, pulley 186 on arm 190, and is anchored at the other end to wall 175 at 188. These cables 164 and 166 provide the drive transmission for movement of carriages 140 and 151 as will now be described.

Movement of the card 10 in the $x$ direction away from projection position and into printing position for printing in the proper frame on the scorecard is determined by the movement of pulleys 174 and 186 carried on $x$-arm 190 pivoted at 191 and having an extension 190a carrying a follower roller 190b which is spring loaded against $x$-cam 96. As explained hereinabove, cam 96 revolves at the proper time through the one-revolution card positioning clutch 80. This movement causes cables 164 and 166 to move scorecard carriage 140 on rollers 154 along tracks 156 of carriage 151. Link 192 connects $x$-arm 190 to lever 194, pivotably mounted on framework at 195 and having a projection 196 (FIG. 5A). As cam 96 (FIG. 5B) moves angularly, the cam surface thereof falls, allowing cam follower 190b to fall, thereby permitting clockwise motion of the $x$-arm 190, 190a. Thus, link 192 (FIG. 5B) imparts clockwise movement to lever 194 until projection 196 (FIG. 5A) thereon encounters an appropriate step on a frame memory wheel 197 in the appropriate bowler memory. The "appropriate" bowler memory is that in register with projection 196 at the time. Engagement of projection 196 blocks further movement of arm 194, and therefore carriage 140 in an $x$ direction. Follower 190b is blocked from proceeding all the way to the low of cam 96. The steps on the frame wheel of the memory unit are arranged in spiral staircase fashion around the axis of the frame memory wheel which is indxeed to the appropriate frame step relative to projection 196 by means in the calculation section as described hereinafter.

The $x$ and $y$ movements of the scorecard may occur at the same time as will appear, and when the projection 196 encounters a stop on the frame memory wheel 197, the card has attained the desired $x$-position for purposes of printing at that time in the proper frame as recorded by the angular disposition of wheel 197 to present the corresponding proper frame step to projection 196. Specifically, the scorecard is moved in an $x$ direction so as to place the current frame printing area on the scorecard in register with the rightmost one of three 3-wheel accumulators. The low dwell portion on the surface of cam 96 assures that the scorecard will remain in printing position a sufficient length of time for the necessary calculation and printing to be completed, as will be described, before a rise on the surface of cam 96 reengages cam follower 190b to return the card to the normal, projection position. For example, when the card is in projection position it is held there, as regards $x$-motion, by a high on the surface of cam 96, and the rising and falling surfaces referred to may extend only limited angular distances around the cam, while the low dwell portion may encompass a majority of the cam periphery in order to provide a dwell of the card in printing position until the printing operation is complete.

The carriage 151 is resiliently biased upwardly as viewed in FIGS. 5A and 5B toward the printing position or station by spring loaded reels 198 accommodating tapes 199 having their free ends anchored on the carriage 151 as at 199a.

The amount of movement of the scorecard 10 away from home or projection position is that amount proper to place the line of the proper bowler on the scorecard to receive the printed score. For such movement pulleys 172 and 180 are mounted at opposite ends of $y$-arm 200 which is pivotally mounted at 201 to suitable framework and has an extension 200a with a follower roller 206 spring-loaded against $y$-cam 94. Movement of pulleys 172 and 180 toward pulleys 170 and 182 will change the size of the loops in cables 164 and 166 releasing carriage 151 for movement away from home position along tracks 162.

Specifically, on counterclockwise movement of lever 200, the cable loops are reduced in size allowing movement of the carriage 151 upwardly due to the bias of spring means 198 (FIG. 5B). When the lever 200 is returned in a clockwise direction, the size of the loops is increased, returning the carriage 151 downwardly toward home position.

A link 202 (FIG. 5B) suitably connected to extension 200a, has a roller 204 (FIG. 5A) adapted to be controlled by stops 222 and 226 on the turret frame. The turret frame has one such stop for each bowler memory and each stop is disposed to be engaged by roller 204 as link 202 travels upward a proper distance to permit movement of carriage 151 to dispose the score line of the appropriate bowler beneath the print hammer for printing whenever that bowler's memory has been rotated to a print station by the turret.

To move link 202 upward, a fall is provided on cam 94, timed to rotate the follower 206 when it is desired to move the scorecard to print position. When the fall is presented to follower 206, follower 206 rotates counterclockwise with $y$-arm 200 on pin 201 under the urging of springs 198 until roller 204 engages the stop 222 or 226 then in position. Stop 222 or 226 interrupts movement of the lever 200 and follower 206 is held off the low of cam 94 as the loop of cables 164 and 166 have been decreased in size the proper amount to properly position the scorecard in a $y$ direction so that printing occurs in the proper line of the scorecard corresponding to the bowler whose memory unit is positioned opposite the printing hammers.

A substantial portion of the periphery of the cam 94 comprises the low dwell surface which allows the scorecard to dwell or remain positioned for a period of time sufficient for completion of the printing operation. After the printing operation, a rise on the surface of cam 94 causes return of the y-mechanism.

As will appear presently, a single pair of ball information wheels provides ball information for each of the bowlers. Thus, in order to print information for each of the bowlers on several different bowler lines on the scorecard, the scorecard must move variable y distances. Also, the bowler memories are successively indexed to the same print position so that to print cumulative scores from the bowler memories the scorecard similarly must move variable y distances. The stops include a pair of stops for each bowler memory rotated with turret 116. Each pair of stops is angularly spaced about the axis of the turret from each other pair of stops at a position corresponding respectively with the angular position of the respective bowler memory for stopping the carriage in y position. Movement in the y direction is additionally controlled for each bowler a different amount for printing box score and for printing individual ball pinfall. One stop 222 of each pair controls the register of the score card with ball information print wheels for printing ball score in box 20 or 22 (FIG. 2) and one stop 226 of each pair controls positioning of the scorecard relative to the bowler memories for printing cumulative score in area 18 or 19.

As seen best in FIGS. 11 and 15, the stops 222 controlling y movement of the printer for ball score are carried on a spider 220. This spider 220 is rotatable with the bowler memory turret 116 and indexable relative thereto and includes a plurality of spider arms 221, six as illustrated, one for each bowler memory. Each arm 221 terminates in an abutment forming the stop 222. Stops 222 are designated 222–1 through 222–6 (FIG. 11) progressing counterclockwise around the spider and each in this order is successively closer to the axis of the turret and therefore enables successively greater movement of the scorecard to the successively positioned bowler lines 1 through 6 thereon for ball score printing.

The second stop 226 of each pair is provided on a frame portion 225 of the turrent. Stops 226 are designated 226–1 through 226–6, progressing counterclockwise around the turret and in that order each successive stop is successively closer to the center or axis of the turret and thereby also permits successively greater score card movements in the y direction.

Movement of the scorecard in a y direction to encounter the box score print wheels in the calculation system 29 is less than that required for the scorecard to encounter the print wheels in the memory system 28 for printing score for the same bowler. Accordingly, each stop 222 controlling movement for ball score printing for a bowler is on a radius, relative to the turret axis, greater than the corresponding or paired stop 226 controlling cumulative score printing for the same bowler.

Upon completion of printing of ball score information for a particular bowler in a particular frame, if it is necessary to then print frame or cumulative score information, the card is moved an additional distance in the y direction by indexing the spider 220 to remove the stop 222 from the path of the roller 204 thereby to permit the roller 204 to move against the stop 226 for the same bowler memory position.

Referring particularly to FIG. 15, the spider 220 is indexable by means of a slide 230 adapted to function somewhat as a drive pawl. Slide 230 terminates in a pawl end 231 engageable with teeth 232 on spider 220. Slide 230 is reciprocable substantially in the direction of its length by virtue of a pivotal interconnection at 234 with an arm 235, suitably affixed on a shaft 236 for oscillation therewith. The shaft has its movement controlled in a manner, as described in more detail hereinafter, such that movement of the arm 235 in a counterclockwise direction at the proper time is effected, thereby driving the slide 230 downwardly as viewed in FIG. 15 and indexing the spider 220 in a counterclockwise direction and relative to the turret. Arm 235 is moved counterclockwise when it is desired to print cumulative score.

THE PRINTING SYSTEM

To provide a projectable record of individual ball scores, the first ball pin count is printed in box 20 on the scorecard and the second ball score (the total count received on the first and second balls), is printed in box 22. Referring to FIGS 5 and 12, first ball print wheel 251 and second ball print wheel 252 are utilized to print these scores. First ball wheel 251 includes eleven print type slug surfaces for printing the numerals 0 through 9 and a "strike" symbol "X," spaced seriatim around the periphery or tread thereof. Second ball wheel 252 includes a similar arrangment of eleven type slug surfaces for printing numerals 0 throuh 9 and a "spare" symbol "/" spaced seriatim on the tread. Print wheels 251 and 252 are rotatable on shaft 253 and can be indexed to their proper count by means to be described in detail hereinafter.

An ink ribbon 254 on rolls 255 and 256 (FIGS. 5A and 12) is provided above the scorecard 10 when card 10 is moved into position for printing box scores above print wheels 251 and 252 which back scorecard 10 during printing.

A first ball printing hammer 261 and a second ball printing hammer 262, each having a flat striking face 261′ or 262′, are provided as shown in FIGS 5A and 9. Hammers 261 and 262 are pivoted on a shaft 263 and each includes an integral upper arm portion 264 and 264′ respectively. The upper arm 264 is connected to a print solenoid 265 as at a pivot 266, and the upper arm 264′ is connected to a print solenoid 267 as at pivot 268. Therefore, as first ball print solenoid 265 or second ball print solenoid 267 is activated at the proper time by an input signal, to be described later, the printing hammers for first or second ball scores will be activated. For example, when solenoid 265 is activated, the solenoid plunger therein pulls against link 264 at connecting 266, pivoting hammer 261 about shaft 263 in a counterclockwise direction. The hammer head 261′ then forces the ink ribbon 254 (FIG. 12) against the upper surface of card 10, and presses the card 10 into contact (at the rear surface thereof) with ball print wheel 251 to print the pin count on the top surface of the card. After the printing occurs, the scorecard 10 is returned to the projection position as described hereinabove and the score just printed will be projected.

BOWLER SCORE MEMORY SYSTEM

In order to provide for the printing of player frame-by-frame and total game scores, and team total and player-by-player subtotal scores, a bowler memory including a series or set of accumulators, having accumulator number wheels in the form of print wheels and identified at 270, 271, 272 and 273 (FIGS. 5A and 14), is provided for each of the six bowlers. Each set of accumulators is mounted on a shaft as at 274 in the turret 116 and is indexed with the turret so that the proper bowler's accumulator will be in printing position at a printing station for printing the bowler's frame score from the accumulators at the proper time as will be described hereinafter. Each of the accumulators 270, 271 and 272 is composed of three number wheels, each number wheel having ten print type slug faces spaced around the periphery thereof, including numbers from 0 to 9, respectively. Accumulator 273 consists of four such wheels. Thus, it will be seen that by indexing with the proper input to be described hereinafter, each of the accumulators 270, 271 and 272, may be made to read any number from 000 to 999 and accumulator 273 may be made to read any number from 0000 to 9999.

PRINTING FRAME SCORE MEMORY SYSTEM

Three 3-wheel accumulators as 270, 271 and 272 are provided for each bowler in order to permit frame score printing in frames other than the most current frame. At various times, as will be discussed in more detail hereinafter, it may be necessary to print the bowler's frame score in area 18 of the frame being bowled, the frame one frame back from that being bowled or the frame two frames back. This is accomplished by aligning the scorecard 10 in the x direction with the current frame positioned above accumulator 272 of the proper bowler's set of accumulators. This places accumulator 271 beneath the frame preceding the current frame and accumulator 270 beneath the frame two frames back from the current frame. The 4-wheel accumulator 273 is used only to print the bowlers' subtotals and the total team score in area 19, where four digits may be required.

Frame score printing hammers 280, 281, 282 and 283 are provided to cooperate respectively with accumulators 270, 271, 272 and 273. These print hammers are pivoted on shaft 263 and each includes an integral upper arm pivotally connected to the pull rods of print solenoids 285, 286, 287 and 288, respectively.

In operation, the scorecard 10 is moved to the proper position as described hereinabove and rests between the ink ribbon 275 and the accumulators 270-273 with the print hammers 280-283 poised above an ink ribbon 275, mounted on rolls 276 and 277 similarly to ink ribbon 254 previously described. Upon activation of the desired printing solenoid (one of 285-288) by a signal to be later described, the solenoid activates its printing hammer forcing the ink ribbon 275 against the scorecard 10 and pressing the ribbon and card against the accumulator positioned therebeneath, thus printing the score indicated on the accumulator on the top side of the scorecard. The scorecard 10 is then moved back to projection position as described above and the printed score is then projected.

The mechanism described, depending on the printing solenoid 285-288 actuated, causes printing of the proper bowler's score on the upper surface of frame scorecard 10 in area 18 of the present frame, one frame back or two frames back or printing of the subtotal and team total scores in area 19, with the scores being printed in any of the six bowler's lines, A-F, by means of the scorecard positioning system described previously.

Ink ribbon rolls 256 and 277 are indexable so as to place a new ink ribbon surface on ribbons 254 and 275 beneath the printing hammers. Accordingly, rolls 256 and 277 are mounted on a shaft 290 (FIGS. 5A and 12) supported as by a U-shaped bracket 291. A bevel gear 292 is affixed to shaft 290 and cooperates with a bevel gear 293 mounted on a pinion 294. The pinion 294 is mounted to bracket 291 and includes a one-way clutch at 295. A rack 296, in mesh with pinion 294, is connected to card positioning carriage 151. In operation, the carriage 151 is moved in the y-direction as it travels to print position as discussed hereinabove, and as it so moves, rack 296 drives pinion 294 thereby rotating rolls 256 and 277 by means of gears 292 and 293. As the carriage 151 is returned to projection position, as discussed hereinabove, the one-way clutch 295 permits pinion 294 to rotate in a reverse direction with the movement of rack 296, without affecting the position of rolls 256 and 277. Therefore every time carriage 151 is moved in the y direction, the ink ribbons 254 and 275 will be indexed to present a new inked surface beneath the printing hammers and above the scorecard 10.

To further provide for the proper operation of the ink ribbons 254 and 275 in cooperation with their respective printing hammers 261, 262 and 280, 281, 282 and 283, a plurality of ribbon depressors, one for ribbon 254 and two for ribbon 275, are provided. Depressors 297 and 298 for ribbon 275 comprise elongated members having heads 297a and 298a at one end thereof resting against ribbon 275 and are affixed to shaft 263 as at 299 and 300 respectively so that the depressors 297 and 298 will pivot with shaft 263 as shaft 263 is turned. Further provided on depressors 297 and 298, at the other end thereof, are upper arms 297' and 298' (FIG. 13A) affixed to a movable shaft 301 (FIGS. 13A and 14). Shaft 263 is spring biased in a clockwise direction as viewed in FIG. 14 by torsion spring 302. In operation, when any of printing hammers 280, 281, 282 or 283 are activated by their respective solenoids the upper arms of the printing hammers will strike shaft 301 thus driving ribbon depressors 297 and 298 against ribbon 275 slightly ahead of the printing hammer heads and thus position the inked ribbon 275 in its proper printing position. When the printing hammer driving the shaft 301 is returned by its respective printing solenoid, spring 302 will return the shaft and ribbon depressors 297 and 298 affixed thereto to their original position.

A ribbon depressor 303 (FIG. 5A) depresses ribbon 254 just prior to the printing hammer strokes of hammers 261 and 262. Depressor 303 operates in the following manner. Depressor 303 pivots on shaft 263 and is disposed between the first ball print hammer 261 and the second ball print hammer 262 and includes head 303a (FIG. 12) which contacts ribbon 254. A transverse pin 304 (FIG. 5A) is affixed to depressor 303 and pin 304 cooperates with pusher pins 305 and 306 mounted at the pivots of print hammers 261 and 262 respectively. Shaft 263 is spring biased by spring 302, as discussed hereinabove. A one-way mechanism is provided at 307 to permit depressor 303 to remain stationary when shaft 263 rotates, but to rotate shaft 263 with depressor 303 when depressor 303 is pivoted to depress ribbon 254 and return depressor 303 with shaft 263 after shaft 263 has been rotated with depressor 303. Thus when either print hammer 261 or 262 is activated by its respective solenoid, the respective pin 305 or 306 on the activated print hammer drives against pin 304 on depressor 303 and forces depressors head 303a along with ribbon 254 to a proper position above the scorecard 10. As depressor 303 pivots, it rotates shaft 263 thus also activating ribbon depressors 297 and 298, affixed to shaft 263, to depress ribbon 275 away from the path of ball print hammer 261 or 262. When the print solenoid which activated the proper printing hammer 261 or 262 returns the hammer to its nonprinting position, the respective pin 305 or 306 will be moved in a direction away from pin 304 thus allowing spring 302 through the one-way mechanism 307 to return ribbon depressor 303 to its beginning position, and in turn raise ribbon depressors 297 and 298, which are fastened to shaft 263, to their original position. Therefore, mechanism is provided to depress ribbons 254 and 275 every time a ball print hammer 261 or 262 is activated, and to depress only ribbon 275 every time any of the frame score or total hammers 280, 281, 282 or 283 is activated.

BOWLER HISTORY MEMORY SYSTEM

The memory section includes the rotary turret 116 which is indexable to six angular index positions, each position presenting a separate bowler's memory at a score entry and printing station for entry of score into and/or printing from the memory. As discussed generally hereinabove, the turret 116 carries six angularly spaced sets of bowler's accumulator number wheels, six angularly spaced memories "No. 1," six angularly spaced memories "No. 2" and various indexing mechanisms and stops. The turret, its components and its environment are shown in FIGS. 5A, 6, 8, 9, 11 and 13A through 15.

In FIG. 5a, as has been discussed, continuously rotating drive shafe 66 from gear box 62 drives shaft 139 and turret 116 one-sixth of a revolution through one revolution clutch 100 and Geneva 115 each time solenoid 102 is actuated. Shaft 139 is rotatably supported in the scorer from frame 173 by bearings 310 and 312 and bushing 311. As shown in FIGS. 5a and 8, the Geneva 115 is affixed to shaft 139 and driven therewith and forms a portion of the turret assembly which also includes an end support plate 313, intermediate support plates 314 and 315 and another end support plate 316, all affixed on and normal to shaft 139.

Six sets of bowlers' accumulators, each set containing accumulators 270, 271, 272 and 273, are mounted on angularly and equally spaced shafts 274 around the turret 116 between plates 313 and 314. Shafts 274 impale plate 314 and six memories No. 1 are rotatably mounted on shafts 274 beyond plate 314, with the centers of the memories No. 1 in line with the centers of the bowler accumulators. The six memories No. 2 are mounted on shafts 375 which are in turn rotatably mounted by bearings 376 and 377 through plates 315 and 316 with the centers of shafts 375 and the memories No. 2 shifted out of line or phase in positoin midway between the centers of the shafts 374 and the memories No. 1.

Therefore, when the Geneva mechanism 115 is indexed one-sixth of a revolution by the one-revolution clutch 100 as was described hereinabove, the entire turret 116 will rotate with shaft 139 one-sixth of a revolution in a clockwise direction in FIG. 9 advancing the next adjacent set of bowlers' accumulators and memories to the score entry and printing stations.

MEMORIES NO. 1

Each memory No. 1 functions to determine which printing hammer will operate and includes nine cam discs fastened together to form a cylinder having a periphery including various teeth and indentations. This is best shown in FIG. 16 where the individual discs are shown in perspective, exploded from each other.

Referring to FIGS. 13a and 16, the nine discs are identified, from left to right, by reference numerals 350, 352, 354, 356, 358, 360, 362, 364 and 366. Disc 350 is the first ball disc and includes three cavities, 350a, 350b, and 350c, cavity 350c being larger than cavities 350a and 350b. Disc 352 is the second ball disc and also includes three cavities 352a, 352b, and 352c with cavity 352c larger. Disc 354 is a ratchet control disc having nine teeth thereon. Disc 356 is a strike ratchet disc having six teeth.

The next four discs are all constructed similarly but are offset so that their various cavities will occupy properly angularly disposed positions on the memory No. 1 cylinder periphery. These discs are a third hammer disc 358, a second hammer disc 360, another second hammer disc 362 and a first hammer disc 364, each having two cavities designated a and b. The ninth disc 366 is a spare ratchet disc having one tooth thereon.

The nine discs for each memory No. 1, as mentioned, are stacked in the order shown in FIG. 16 to form a cylinder. Each cylinder is indexable on a shaft 274 for programming the operation of the various printing hammers for proper printing of scores from the first and second ball wheels 251 and 252 and from the bowler score accumulators.

MEMORIES NO. 2

Each memory No. 2 determines the positioning of the score card based on the frame being bowled by a particular bowler. Referring to FIGS. 5a, 13b and 15, each memory No. 2 includes a spiral staircase shaped step cam 197, four ratchet wheels 380, 382, 383 and 384, and a cam disc 390 having reset rises 390a and 390b, concentrically mounted on rotatable shaft 375 between plates 315 and 316.

Referring particularly to FIG. 13B, step cam 197 is affixed to shaft 375 and includes a circular array of thirteen spaced detent receivers 378a for cooperating with spring loaded detent button 378 as a conventional resilient detent for releasably registering shaft 375 and cam 197 in thirteen different angular dispositions on the axis of shaft 375 relative to end plate 316 in turret 116. Ratchet wheel 380 has thirteen teeth spaced similarly to detent receivers 378a and is keyed to shaft 375 at 381. Ratchet wheels 382, 383 and 384 are fastened together and rotatably mounted on shaft 375. Ratchet wheel 382 includes one tooth thereon, ratchet wheel 383 has thirteen teeth thereon, and ratchet wheel 384 includes two teeth thereon. The purpose of these ratchet wheels will be described in more detail hereinafter. A torsion spring 385 is attached between ratchet wheel 380 and the singular group of ratchet wheels 382, 383, and 384. This spring cooperates with a stop 386 and urges ratchet wheels 382–384.

Movably mounted on the end of shaft 375 and affixed to ratchet wheel 384 is disc 390, the periphery of which includes two reset rises 390a and 390b. The outer face of disc 390 also carries microswitch activators 391, 392, 393 and 394 (FIGS. 13B and 15) which activate microswitches 401, 402, 403 and 401, respectively. The purpose and operation of these microswitches will be described in detail hereinafter.

The above described memories No. 1 and No. 2 receive an input of information from various mechanisms which will be described in detail hereinafter. This information is an indication of the bowler's history, and is stored in memories No. 1 and No. 2 until it is needed in the actual readout of score information relating to the bowlers' game. The information is then taken from the memories by various levers, pawls and feelers which will be described in detail hereinafter and is utilized to operate the proper printing hammers and scorecard positioning mechanism in providing a visual indication of the bowler's score.

More details of memories No. 1 and 2 will be given in discussions of their operation hereinbelow.

THE RECEPTION AND CALCULATION SYSTEM

As described generally before, the Reception and Calculation System receives inputs from the automatic pinsetter and converts these inputs into bowler's score information. This system further includes means for utilizing score information and transmitting it to and from the necessary memories and accumulators once the memories and accumulators have been properly indexed to receive the information, i.e. to the score entry and print stations prior to printing the score.

Referring to FIGS. 13B and 14, the system is designed to receive a pinfall input signal of the type which includes one successive pulse for each pin down. Such a signal can be generated by scanning pinsetter detection switches or by manually closing a normally open switch a number of successive times corresponding to pin count. The pinfall input signal is received by a first ball solenoid 420 on a first ball condition and a second ball solenoid 421 on a second ball condition. Each of these solenoids is connected to a link 422 or 423, the first ball and second ball links respectively, as by pin 424 or 425. The links 422 and 423 (shown in FIG. 14) extent to and are connected to a first ball lever 426 and a second ball lever 427, respectively, which are, in turn, attached to shaft 253 in such manner that as the first or second ball solenoids 420 and 421 pull in, shaft 253 can be rotated counterclockwise in FIG. 14, as will be described. Shaft 253 is returned clockwise by torsion spring 253a (FIG. 13B) upon deenergization of the solenoid 420 or 421.

First ball wheel 251 and second ball wheel 252 are rotatably mounted on shaft 253. A first ball wheel pawl 428 and a second ball wheel pawl 429 are attached to levers 426 and 427 respectively to engage ratchet portions 251a and 252a (FIGS. 13B and 14) of wheels 251 and 252 respectively. Thus, as the levers 426 and 427 are moved once for each pin count input, the pawls 428 and 429 also move and index the ball wheels 251 and 252, one number tooth for each pin count input to solenoids 420 or 421. The ball wheels 251 and 252 are spring-biased to their zero position by conventional torsion spring means. A fixed pivot pawl retains each of the ball wheels 251 and 252 respectively from reverse motion while these ball wheels are indexing.

When lever 426 or 427 is moved by solenoid 420 or 421, it bears against an arm 430 or 431 (FIG. 13B) which arms in turn are affixed to shaft 253, thereby indexing the shaft. This indexing of shaft 253 is transmitted to an arm 432 secured to and pivoting with shaft 253. Arm 432, on pivoting, engages a roller 432a on a slide 433 to move slide 433 upward in FIGS. 13B and 14. Slide 433 engages a roller 434 which is carried on an arm 435. One arm 435 is secured to each shaft 274 carrying the bowler score accumulators 270, 271 and 272 and team total accumulator 273 in each bowler's memory unit. Also secured to each shaft 274 are a pair of pawl arms 440 forming a bail with a rod 440a carrying a pawl 440b for operating a ratchet portion of the units wheel of each accumulator 270, 271 and 272 to rotate the wheel and add one count to each of the accumulators. Thus, as the pinfall signal from either the first ball solenoid 420 or the second ball solenoid 421 is transmitted through this linkage from rocking of shaft 253 once for each pinfall, the number wheel accumulators 270, 271 and 272 are advanced one number for each pinfall signal. Slide 433 returns by gravity after each upward movement.

The pawl arm 440 has a projection which abuts against another pair of pawl arms 441, pivotal on shaft 274 and forming a bail with a rod 441a carrying a pawl 441b for rotating ratchet 274a to also add one count to the team total accumulator 273 of the bowler's memory system each time pawl arm 440 is pivoting counterclockwise in FIG. 14 for each pin down signal. However arms 441 can be pivoted counterclockwise in FIG. 14 independently of arms 440 for team handicap entry of the like.

A slotted link 442 (FIG. 14) is connected from pawl arm 441 to the pawl arm 440 of the next bowler's accumulator mechanism or memory system. Each time score entry is made in one bowler team total memory, or accumulator 273, the accumulator 273 of any subsequent bowler's memory linked thereto by link 422 also receives the identical score entry. There is such a connecting link 442 between all total score accumulators 273 except bowlers F and A. Each slotted link 442 has a lost motion connection with arms 441 so that only the arms 440 of subsequent bowlers' memories are actuated for entry of score values so that proper player by player end of game subtotals are calculated for printing from the series of total score accumulators 273.

Forming a part of the ball wheels 251 and 252 are cylindrical surfaces 451 and 452, respectively. Each of surfaces 451 or 452 includes one rise 451a or 452a (FIG. 13B) which, as the ball wheel prepares to indicate a full or 10 count pinfall, contacts a feeler 453 or 454 respectively, thus indicating that bonus values for a strike or spare must be registered in the bowler memories. Feelers 453 and 454 are pivotal on shaft 446. More particularly, as the first or second ball wheel 251 or 252 reaches the 9 count, the rise 451a on surface 451 or rise 452a on surface 452 moves the feeler 453 or 454 which pivots clockwise in FIG. 14 to release a latched lever 465 or 466 and prepares lever 465 or 466 for movement at the 10 count. These levers 465 and 466 are affixed to shafts 468a and 468b respectively, and movement of levers 465 or 466 after either a strike or spare causes rotation of shaft 468a or 468b. Further, connected to shafts 468a and 468b are a pair of levers 469 and 470, the top portions of which are pivotally connected to links 422 and 423 by a pin and lost motion slot arrangement 471 or 472.

Also secured to shafts 468a and 468b are cranks 473a and 474a (FIG. 13B) having links 473 and 474 pivotally connected thereto at one end. The opposite end of link 473 or 474 is pivotally connected to a crank 475 or 476 (FIG. 13A). Crank 476 is rotatable on a shaft 477, and crank 475 is keyed to shaft 477. Another crank 479 is splined to shaft 477. Crank 476 has an operating arm 478 (FIG. 14) for operating a pawl 481 and crank 479 has a similar operating arm for operating a pawl 480. Pawls 480 and 481 in turn operate the memory No. 1 mechanism for strike and spare input, as will be described in detail hereinafter.

In order to enter bonus count information into the bowler's accumulator, first and second ball wheels 251 and 252 are provided with cylindrical surfaces 455 and 456, each having 10 equally spaced rises on the periphery or tread thereof. Roller feelers 457 and 458, respectively, are disposed to contact these rises as wheels 251 and 252 are rotated, each rise placing a pin count in a first ball impulse switch 459 or a second ball impulse switch 460, switch 459 being momentarily closed by each rise on wheel 251 passing feeler 457, and switch 460 being momentarily closed by each rise on wheel 252 passing feeler 458.

An extras circuit (FIGS. 13A and 13B) is provided for receiving impulses from switches 459 and 460 for introducing extra pincount into the bowlers accumulator as required. The extras circuit is normally open and is closed and reopened during each scoring cycle so that the circuit is colsed immediately prior to printing cumulative score and is reopened after printing and before the turret is indexed, e.g. immediately prior to turret indexing. The extras input into the accumulator is via a solenoid 485 and all input impulses to solenoid 485 pass through switch 483. Switch 483 is normally open but is closed by a cam (not shown) on shaft 92 (FIG. 9) after pincount input to wheels 251 and 252 is complete but before printing cumulative score and is reopened by the cam prior to the end of the one revolution of shaft 92. This keeps the extras circuit closed at a time when proper extras input to solenoid 485 is available but opens the circuit to exclude improper input, as will be seen.

In the extras circuit, pin count impulses are fed to a solenoid 485, by switches 459 and 460, one impulse for each extras to be added as a bonus score. The solenoid is linked to enter the pin count by pulling link 486, pivoting a lever 486a on shaft 253 (FIG. 13B) in a counterclockwise direction as would be viewed in FIG. 14, once for each impulse fed to solenoid 485. Lever 486a has an arm shaped like arm 432 which engages a roller 486b on slide 433 to move slide 433 in the same manner as done by arm 432, to add to the bowler's accumulators 270, 271 and 272 and the team total accumulator 273 as previously described. Extras solenoid 485 receives its impulses from first ball impulse switch 459, second ball impulse switch 460 or a ten impulse motor step switch 490 (FIG. 13A) when the extras solenoid circuit is open. Ball impulse switches 459 and 460 are operated by the rises on surfaces 455 and 456, as was described hereinabove, through feelers 457 and 458, respectively, to give one impulse per one pinfall count.

For normal release of the first and second ball wheels, a crank 611 (FIG. 14) is pivotally mounted at 612 and has a roll 613 on one arm thereof riding on cam 603. The other arm of crank 611 is connected by a cable 614 to an arm 615 pinned to shaft 616. Three other arms 617 are pivotal on shaft 616, each being secured to one of three cables 502a, 502b and 502c. Thus, after each scoring cycle, when the turret indexes to the next bowler's station, roller 613 rides out of a low dwell on cam 603, pulling cable 614, turning crank 615 and shaft 616. An abutment on shaft 616 carries cranks 617 counterclockwise when shaft 616 is turned counterclockwise in FIG. 14 but permits free movement of cranks 617 counterclockwise without thereby turning shaft 616. Cranks 617, through cables 502a, 502b and 502c pull cranks 505 and 506 which engage and pivot pawls 428 and 429 for releasing first ball and second ball pin count wheels 251 and 252. Wheels 251 and 252 are reset to zero pin count via their return springs.

For release of the first and second ball wheels at a time when the extras circuit is closed, separate cables 502a, 502b and 502c extend via separate pulleys as shown at 503 and 504 from hammer 280 to first ball crank 505, from hammer 281 to first ball crank 505 and from hammer 281 to second ball crank 506 respectively. Thus, as these hammers are actuated for printing cumulative score in previous frames, the first and second ball wheels 251 and 252 are released to return to zero. At this time the extras circuit is closed so that the rises and falls on the first and second ball wheels introduce pin count into the accumulators via solenoid 485, thereby scoring an extra 10 pins for each strike from the first ball wheel or each spare from the second ball wheel. Thus, the extra or bonus pin count is added to the accumulators after scoring of the respective previous frame, as it should be in accordance with standard bowling scoring practices.

Later, when the extras circuit is again opened during the end of the cycle and the first and second ball wheels resulting from any non-strike or non-spare ball are released without scoring through solenoid 485.

The extras circuit also includes a ten impulse motor stepper switch 490, a time delay 492 and a normally open microswitch 494, the microswitch 494 being operated by an arm of printing hammer 280, which hammer was described in the printing system.

The solenoid 485 can also receive impulses from the ten impulse motor stepper switch 490 as appropriate. The print hammer 280 closes switch 494 on each print stroke by hammer 280. Switch 494 energizes a ten count bonus entry system by closing a circuit through a delay 492 to a ten impulse motor step switch 490 which, when energized after the delay, feeds ten consecutive impulses to solenoid 485 for entry of a bonus of ten to the accumulator. The delay by signal delay 492 is for the purpose of permitting entry of bonus pins via switch 460 during resetting of second ball wheel 252 before the ten impulses are received from the stepper switch 490 so that impulses are not received by solenoid 485 from two different sources at the same time. The actuation of the ten count bonus entry system by hammer 280 assures that the bonus of ten is entered only when appropriate, i.e. only on a third consecutive strike. Thus, it is possible that any bowling score can be placed on the proper bowler accumulators 270, 271 and 272 by various combinations of the pin count taken from first and second ball wheels 251 and 252, first and second ball bonus counts taken from the rises on surfaces 455 and 456 and the 10 count bonus input taken from extras solenoid 485.

As the proper bowler's score is now indicated on the bowler's accumulators 270, 271 and 272 it is now necessary that the scorecard 10 be placed in proper printing position so that the bowler's score may be printed on the scorecard 10 in the proper scorecard areas as was previously described in the Scorecard Support and Handling System. It is therefore possible to print the bowler's score in the proper scorecard areas at the proper time and return the scorecard to the projection position.

ACTUATION OF FIRST AND SECOND BALL PRINT HAMMERS

In order to actuate the printing solenoids 265 and 267 which control hammers 261 and 262 for printing first and second ball score from ball wheels 251 and 252 respectively, a signal is taken from shaft 92 (FIGS. 5B and 9) in the Scorecard Handling System. This is accomplished by a cam 520 (FIGS. 9 and 10A) affixed to shaft 92. Cam 520 has a switch actuator rise 520a. When the scorecard has been positioned in printing position as discussed hereinabove, projection 520a contacts and closes switch 521. Switch 521 is in series with a power source and two branch circuits which are parallel to each other. The first branch circuit is a series circuit of a first ball switch 552a and solenoid 265 and the second branch circuit is a series circuit of a second ball switch 553a and solenoid 267. The first and second ball switches (FIG. 13A) are present in the pinsetter and are selectively closed by the pinsetter responsive to a first or second ball condition respectively. Thus, when switch 521 is closed at 350°, the proper solenoid 265 for first ball or 267 for second ball respectively is energized. The solenoid 265 or 267 drives the proper print hammer 261 or 262 for printing first or second ball score.

The end 264 and 264' of each of the printing hammers 261 and 262 are pivotally connected by pins 525 through slots in slotted links 528 and 527 respectively (shown in FIG. 9). The opposite ends of the slots in links 527 and 528 are pivotally and slidably connected to feelers 529 and 530 (FIGS. 9, 13A and 15) respectively by pins 531. These feelers are pivoted on shaft 236 and contain pointed feeler ends 529' and 530' respectively. A tension spring 534 or 535 is connected between each pair of pins 525 and 531 along links 527 and 528 to urge the pins to a position normally toward each other in the slots of links 527 and 528.

As the first or second ball printing hammer 261 or 262 is operated by the proper print solenoid 265 or 267, spring 534 or 535 urges the nose 529' or 530' of the feelers 529 or 530 to move against the periphery of memory No. 1, i.e. against cam discs 350 or 352 (see FIG. 16) to detect the possibility of cavities or lows being present under the feeler nose. Feelers 529 and 530 have lugs 529a and 530a (FIGS. 13A and 15) abutting a pin 236a through shaft 236 so that on detection of low on cam 350 or 352, shaft 236 is pivoted slightly counterclockwise as viewed in FIGS. 9 and 15 against the urging of return torsion spring 236b (FIG. 13A), pivoting arm 235 (FIGS. 13A and 15) which is secured to shaft 236. Pivoting of arm 235 causes the downward operation of slide 230 to rotate spider 220 and thus indexes the spider 220 in a counterclockwise direction (FIG. 15) as was described hereinabove to prepare for bringing the scorecard to the same bowler's cumulative score print position. The cavities on discs 350 and 352 are so arranged on memory No. 1 that the scorecard 10 will go to a cumulative frame score print position only when it is necessary to print a cumulative frame score.

ACTUATION OF CUMULATIVE SCORE PRINT HAMMERS

After the first or second ball count has been printed, a cam 540 (FIGS. 9 and 10B) rotating with shaft 92, controls a set of four feelers 541, 542, 543 and 544 (FIGS. 11, 13A and 16), pivotal on shaft 236 for contacting the periphery of memory No. 1 at cam discs 358, 360, 362 and 364 respectively. These discs, discussed hereinabove, each contain two cavities in their periphery and are so positioned to allow the feelers 541, 542, 543 and 544 to actuate microswitches 552, 553, 554 and 555 (FIGS. 11 and 13A) at the proper time to cause the correct print hammers to print the bowler's score.

In operation, this is accomplished in the following manner. The cam 540 includes a low dwell portion 540a which cooperates with a cable linkage consisting of an arm 545 (FIG. 10B) pivoted at one end as at 546, having a cam follower roller 547 and having a tape or cable 548 affixed to the other end of the arm 545 at 549. Cam 540 revolves with shaft 92, and the low dwell portion 540a is presented to the cam follower 547 and the cable 548 is loosened as follower 547 follows dwell 540a. The cable 548 is attached to an arm 551 (FIG. 11) secured to shaft 236 and having a bail portion 551a abutting projections on each of feelers 541, 542, 543 and 544. These feelers 541, 542, 543 and 544 are pivotal on shaft 236 and biased by springs 550 into abutment with bail 551a, so that as the cable 58 is played out by cam low 540a bail 551a can be pulled counterclockwise by a spring 548a urging feelers 541, 542, 543 and 544 also counterclockwise through springs 550 to contact the periphery of memory No. 1. When a low is present beneath any of the feeler ends, the corresponding feeler 541, 542, 543 or 544 falls in the low.

Feelers 541, 542, 543 and 544 each have extensions (FIGS. 11 and 13A) for contacting one of four microswitches 552, 553, 554 and 555 respectively. These microswitches are divided into two systems. The first system includes the pair of switches 552 and 554 for a first ball condition, and the second includes the pair of switches 553 and 555 for a second ball condition. Each of these pairs of switches, 552, 554 and 553, 555, is connected in series with another switch 552a and 553a (FIG. 13A), respectively, which switches 552a and 553a are controlled by the pinsetter so pairs of switches 552, 554 or 553, 555 can only complete a circuit when the first ball or second ball switches 552a or 553a are closed. The microswitches 552, 553, 554 and 555 are connected through one of switches 552a or 553a to print solenoids 285, 286, 286 and 287, respectively, by a conventional electric circuit, to drive hammers 280, 281, 281 and 282, respectively. Thus, as the proper feelers are activated by the memory No. 1 cavities, the proper print solenoid is actuated for printing proper digit positions of the score. Upon actuation, any one of these hammers engages shaft 301 and resets memory No. 1 back one tooth. Print hammers 280 and 281 also, at this time, initiate the action for the input of extra bonus score, if necessary.

In order to return spider 220 to its normal turret position after printing cumulative score, the spider is reset by a mechanical linkage between shaft 92 (FIG. 9) and ratchet-like teeth 232 on spider 220. This mechanical linkage consists of a cam 560 attached to shaft 92 and rotating therewith. Near the end of each revolution of the one-revolution clutch 80, as described hereinabove in the Drive System, cam 560 contacts a slide 561 and moves this slide in a generally upward direction. Slide 561 is spring biased toward its downward return position. When slide 561 is moved upwardly by cam 560 at the proper time, the nose of slide 561 contacts ratchet-like teeth 232 and moves spider 220 to a spring detent position as at 563 (FIG. 15). Considering especially FIG. 15, as slide 561 moves upwardly, it pivots an arm 564 which carries a cam 565. Cam 565 moves with arm 564 and depresses a spring loaded latch 569 to release an arm 566 which is pivotal on pin 566a. A pawl 567, connected to arm 566, has a nose for engaging ratchet wheel 380. As slide 561 raises to index spider 220 to normal position, cam 565 raises arm 566 from a spring-biased latch member 569 and releases arm 566 so that pawl end 567 is spring urged by a spring 567b (FIG. 13B) against ratchet wheel 380 in memory No. 2. Slide 561 continues upward and indexes the spider while pawl 567 remains engaged to index or advance the ratchet wheel one tooth before a camming rise 568 on the turret 116 lifts pawl 567 from wheel 380. As slide 561 returns downward, arm 564 pivots clockwise in FIG. 15 to depress latch 569 via cam 565 and relatch pawl arm 566.

SKIPPING A BOWLER

If it is desired to skip a player, switch 124 (FIG. 5B) is merely closed to cause indexing of the turret 116 to the next player, and latch 569 remains engaged, with pawl 567 away from ratchet wheel 380 during the indexing because solenoid 78 is not actuated to drive shaft 92 and cam 540. Therefore, the history, i.e. frame memory, of the skipped player is not changed.

OPERATION OF MEMORIES NO. 1

Referring especially to FIGS. 13B and 16, the cylinder of stacked discs making up memory No. 1 is indexable from a first position of angular disposition to or through any of six other positions, i.e. second through seventh positions of angular disposition. The cylinder is biased by a spring 353 (FIG. 13B) against a stop with the cylinder in first position and is movable away from the stop against the urging of spring 353 by pawls 480 and 481 which operate the strike ratchet wheel disc 356 or the spare ratchet wheel disc 366. Generally, when a spare occurs with memory No. 1 in its first position, pawl 481 will engage tooth 366a and rotate the memory to No. 2 position. In the case of a strike, pawl 480 will engage the teeth of disc 356 and rotate the memory two positions, i.e. to position No. 3. Upon a second strike from position No. 3, the pawl will rotate the disc with the memory No. 1 two more positions to position No. 5 and a supplemental stationary pawl or pusher 355 (FIGS. 13A and 14), actuated by the condition of a strike following a strike, will rotate the memory an additional position to position No. 6. In the absence of a strike or spare, the memory will remain in position No. 1.

Thus, memory No. 1 is indexed according to strike and spare conditions to present various lows on cam disc 350, 352, 358, 360, 362 and 364 beneath feelers 529, 530, 541, 542, 543 and 544 respectively. As has been seen, these feelers in turn, when falling in lows on the cam discs, cause actuation of print hammers 261, 262, 280, 281, 281 and 282 respectively.

With the cylinder in position No. 1, feelers 530 and 544 will find lows in the memory cylinder, resulting in printing second ball score and printing total cumulative score after the second ball. On successive miss frames, with no strikes or spares attained, the memory No. 1 will stay in position No. 1 and keep printing the second ball score and current frame cumulative score after rolling of the second ball of each frame. The remaining stations, the feelers which find lows, and the results, are given in the following list:

| Position of memory No. 1 | Feelers finding lows | Results |
| --- | --- | --- |
| 2 | 529, 543 and 544 | If first ball, print first ball score in current frame and print cumulative score in preceding frame; if second ball, print current frame cumulative score (except printing is blocked on a spare condition, as described hereinbelow). |
| 3 | 530 and 542 | If second ball condition, print second ball score in current frame and print cumulative score in preceding frame. |
| 4 | 529 and 543 | If first ball condition, print first ball score in current frame and print cumulative score in preceding frame. |
| 5 | 530 | If second ball, print second ball score. |
| 6 | 529, 530, 541 and 542. | If first ball, print first ball score and print cumulative score two frames back; if second ball, print second ball score and print cumulative one frame back. |
| 7 | 529 and 541 | If first ball, print first ball score and print cumulative two frames back |

The illustrated memories No. 1 are designed to remember the history of typical bowling situations during the game of bowling and particularly for remembering strike and spare conditions for controlling the print hammers to print in the proper frames. In order to simplify the design for easier understanding, the memory No. 1 has been provided with only 7 positions to take care of all strike and spare combinations and modification is made, as will be seen, to block printing by a print hammer where printing is not desired in a particular situation where the printing would otherwise be called for by the memory No. 1.

In order to advance the cylinder responsive to spare and strike conditions, referring to FIGS. 13B, 14 and 16, when the first or second ball wheel 251 or 252 reaches a count of 9, a rise on the wheel, at 451a or 452a, moves a lever 453 or 454 clockwise as viewed in FIG. 14, thereby unlatching a lever 465 or 466, which is pivotal on shaft 468a or 468b and spring loaded by spring 467a or 467b to arm 469 or 470 to swing clockwise and follow arm 469 or 470 when the 10th count is made by solenoid 420 or 421, thereby pulling link 473 or 474 downward in FIG. 14 to pivot arm 475 or striker arm 476 clockwise for striking striker arm 479 or 476 on an abutment of an arm 359 or 361 to pivot the arm on shaft 274. The spare pawl 481 and strike pawl 480 are pivotally mounted on arms 359 and 361 respectively and engage and push spare disc 366 or strike disc 356 as arms 359 and 361 are pivoted. If a tooth on disc 366 or 356 is presented to the pawl 480 or 481, the pawl rotates memory No. 1. Movement of the spare pawl 480 constitutes only one tooth distance and therefore, if tooth 366a is presented, will advance the memory only one position. Tooth 366a is presented only when the memory is in position No. 1, and therefore the spare pawl can advance the memory only from position No. 1 to position No. 2. The movement of strike pawl 481 constitutes two teeth of the memory ratchet disc 356 so that if a tooth is presented to pawl 481 the memory is set two positions higher.

A pusher 355 is provided to advance the memory No. 1 an extra tooth after two strikes in a row. Pusher 355 is longitudinally slidably mounted on the turret adjacent memory No. 1 and has a pointed end seen in FIG. 14. The other end of pusher 355 is sloped. With the memory No. 1 in 5th position, a cam surface 357 on the memory is presented directly in line with the longitudinal movement of pusher 355. When the turret is indexed, the sloped end of pusher 355 engages a cam surface (not shown) secured to frame 173 to drive the slidably mounted pusher 355 toward the memory. Only in position No. 5 is the cam surface 357 presented in the line of travel of pusher 355 so that the cam surface is struck by the pusher to advance the memory an additional tooth to No. 6 position. A suitable spring (not shown) returns pusher 355 after each impact.

Also provided is a control ratchet disc 354 and a pair of fixed pivot pawls 363 and 365 mounted on turret 116 for engaging the teeth of disc 354. As discs 356 and 366 are driven by the strike and spare pawls 480 and 481, the pawls 363 and 365 ride in an out of the teeth of disc 354. Pawl 365 is spring urged into the teeth of disc 354 so that as pawls 480 and 481 are withdrawn the memory cylinder retains its angular adjustment.

After each printing of cumulative score, the memory No. 1 is released one tooth by the printing operation. Accordingly, the upper arms of print hammers 280, 281 and 282 (FIG. 13A) engage shaft 301 to pivot shaft 263 which has an arm 367 linked through a link 369 to an arm 371a of a hammer 371 to drive hammer 371 against an arm of fixed pivot pawl 365 (FIG. 13B) driving pawl 365 clockwise in FIG. 14 to release the teeth of disc 354. Fixed pivot pawl 363 is spring loaded in a counterclockwise direction by torsion spring 363a and is normally blocked from counterclockwise movement by a projection of fixed pivot pawl 365. As pivot pawl 365 is pivoted clockwise by hammer member 371, movement of the projection releases fixed pivot pawl 363 to pivot into engagement with the teeth of disc 354 after letting one tooth pass the insertion station of fixed pawl 365. Pivot pawl 365 is returned counterclockwise by torsion spring 365a to engage and pivot the pawl 363 clockwise out of engagement with disc 354. Pivot pawl 365 continues into engagement with the next adjacent tooth of disc 354, thereby completing the one-tooth release.

It will be noted that two teeth are missing from the disc 354, the missing teeth corresponding to positions No. 4 and 5 of memory No. 1 so that when memory No. 1 is released one tooth from position No. 6 it returns all the way to position No. 3.

When memory No. 1 is in position No. 5, there is no print of cumulative score so the memory is not released. As the turret later indexes, the memory is advanced to position No. 6.

Printing of current frame cumulative score is blocked whenever a second ball produces a space condition. Accordingly, the current frame feeler 544 has an extension at 606 (FIGS. 13A, 13B and 14) which is capable of being blocked by a latch member 605, pivotal at 605a on frame 173. Latch member 605 is normally retained away from blocking position by a detent 607 on frame 173. Each time second ball link 474 is pulled downward on occurrence of a spare, a pin 474b on link 474 engages an abutment 605b on an arm of latch 605, pulling the latch clockwise to blocking position (FIG. 14) to block feeler 544 and prevent printing of current frame cumulative score.

Latch member 605 also has a roll 608 on one arm and roller 608 rides on a cam 603 secured to the turret shaft 139 and rotating with the turret as the turret is indexed. Thus, when the turret indexes to bring the next bowler's memories into position, i.e. after completion of scoring of the bowler having feeler 544 blocked from engagement with his memory No. 1, latch member 605 is returned counterclockwise and reengaged by detent 607 to be held until occurrence of another spare condition.

Examples of the operation of the memory No. 1 will now be given. On a first frame miss or successive misses after a first miss, the memory will remain at position No. 1 and control printing as already described, there being no motion of the spare or strike pawls to advance the memory. Occurrence of a spare condition will advance the memory to position No. 2 where the memory will remain until the next frame, printing of cumulative score having been blocked by latch 605. On the first ball of the next frame after a spare, if no strike is made, the memory will cause printing one frame back after the first ball and the memory release mechanism will then release the memory to position No. 1. If, from position No. 1, the second ball of the frame creates a second spare condition, the memory will readvance as before to position No. 2.

As a strike occurs from position No. 1, i.e. first ball of the game or first ball after an open frame, the memory will advance to position No. 3 and stay there until the next frame. If a second strike occurs on the next frame, the memory will advance to position No. 5 where it holds and is then advanced to position No. 6. If, thereafter, another strike is attained, the memory will advance to what would be position No. 8 but since no teeth are provided, the memory falls to position No. 7 where the first ball score is printed and cumulative score is printed back two frames. The memory is then returned to station No. 6 due to the one-tooth release. If at station No. 6, i.e. after two or more strikes in a row, a non-strike occurs on the first ball, the memory causes printing cumulative score two frames back and printing of the first ball score and the memory is then released; but, because of the absence of teeth at stations No. 4 and 5 on ratchet discs 354, the memory returns all the way to station No. 3 for the second ball. After the second ball, the memory prints cumulative score back one frame and prints the second ball score and is released to station No. 2. Upon return to position No. 2, unless a spare has occurred, the current frame cumulative score is printed and the memory drops back to position No. 1. Since current frame cumulative score is blocked on occurrence of a spare, all spare conditions will stay at position No. 2.

On any strike after a spare, the memory advances from position No. 2 to position No. 4, prints first ball score and prints cumulative score back one frame and drops back to position No. 3.

SCORING AFTER NINTH FRAME

Provisions are made to handle certain aspects of scorekeeping which are needed during "bowl out" or tenth frame bowling. For example, bonus or extras are not awarded for strikes and spares in the tenth frame. Team totals are printed in the tenth frame. Also, it is not conventional to print cumulative score in the tenth frame until all frame balls have been rolled, so it is desirable to deenergize printing of cumulative score in the case of a tenth frame strike or spare which does not end the game. Further, a bowler usually completes his tenth frame, once he has started it, without relinquishing the lane to the next bowler, so it is desirable to retain the turret in the bowler's position throughout the tenth frame and through printing of cumulative team score without indexing the turret responsive to a strike, spare or completion of tenth frame bowling.

For these purposes, the frame memory No. 2 has been adapted to impose an overriding control on other portions of the scoring system. The system is controlled so that when the last ball of a game is bowled, the score card will be aligned for printing in the tenth frame with the accumulator 273 aligned for printing in the totals column to the right of the tenth frame. Such alignment is achieved in both the 10th and 13th positions of memory No. 2 because the 10th and 13th steps of cam 197 are of equal height.

In order to actuate the team total print solenoid 288 to drive print hammer 283 to print from type set in accumulator 273, a cam 620 on shaft 92 (FIG. 10d) rotates and closes a switch 622 (FIG. 10c) at about 180 degrees of each revolution of shaft 92. Switch 614 is in series with a normally open contact of switch 401 so that no actuation of print hammer 283 is effected unless switch 401 has been actuated by actuator 391 or 394, i.e. unless memory No. 2 is in the 10th or 13th frame positions. Thus, team score is printed only in a scoring cycle which finishes a game and with the scorecard carriage aligned for printing in the tenth frame.

Printing from accumulators 273 results at the end of the tenth frame for each bowler, and since each bowler's team total includes his own total score plus the total for all bowlers preceding him on the team, the printing from the accumulators 273 as the bowlers finish provides printed team subtotals and team total.

After a game is completed, memories No. 1 and 2 and accumulators 270-273 can readily be manually reset. All detents or pawls engaging these elements can be manually disengaged as needed for reset.

Disc 390 (FIGS. 13B and 15) is provided on its face with activators 391, 392, 393 and 394 for activating switches 401, 402, 403 and 401 respectively. Switches 401, 402 and 403 each have normally closed contact in series with switch 483 and solenoid 485 for deenergizing solenoid 485 and thereby opening the extras circuit, and a normally closed contact in series with solenoid 102 for preventing energization of solenoid 102 and indexing of the turret when the contacts are opened. Switches 402 and 403 also each have a normally closed contact in series with extras solenoid 485 and switch 403 has an additional normally closed contact in series with solenoid 485.

Disc 390 is fixed to ratchet wheels 382–384 for indexing therewith to 13 successive equiangular positions. In the 10th position of disc 390, actuator 391 opens the contacts of switch 401; in the 11th position actuator 392 opens the contacts of switch 402; in the 12th position actuator 393 opens the contacts of switch 403; and in the 13th position actuator 394 opens the contacts of switch 401.

As has been described, cam 197 of memory No. 2 is normally indexed to advance one position counterclockwise (FIG. 15) each frame bowled. Torsion spring 385 (FIG. 13B) normally holds the joined combination of ratchet wheels 382–384 and disc 390 in equiangular orientation with cam 197, i.e. clockwise against stop 386 on wheel 380, for movement of disc 390 counterclockwise (FIG. 15) with cam 197 frame-by-frame. As disc 390 is carried to the tenth frame when the turret indexes, switch 401 is opened, opening the extras circuit and disabling further indexing of the turret. Scoring is as already described. Since the turret is blocked by switch 401 from further indexing throughout the tenth frame bowl out, i.e. through the tenth to twelfth frames, and since indexing of cam 197 and disc 390 are necessary to control scoring and printing, other means are provided for indexing cam 197 and disc 390 during bowl out. Accordingly, ratchet wheel 384 has two teeth which are presented to pawl 575 with disc 390 in the tenth and eleventh frame positions so that movement of pawl 575 will index disc 390 from the tenth to the eleventh frame position or the eleventh to the twelfth frame position respectively on occurrence of a strike. Ratchet wheel 382 has only one tooth which is presented to pawl 576 in the tenth frame position of disc 390 so that movement of pawl 576 will advance disc 390 from the tenth to the eleventh frame position on occurrence of a spare.

Pawl 575, a strike pawl, derives its motion from the strike memory input at shaft 477 which is rotated and returned on occurrence of each strike. An arm 577 is secured to and pivots with shaft 477, pulling a link 578 and a crank 579a which is pivotal on a stub shaft 579. Crank 579a carries pawl 575 into engagement with wheel 384 to move memory No. 2 ahead one frame whenever it engages a tooth on wheel 384.

Similarly, pawl 576 derives its motion from the spare memory input at shaft 468b which rotates and returns on each spare. An arm 585 is secured to and pivots shaft 468b, pulling a link 586 and pivoting a crank 579b on stub shaft 579. Crank 579b carries pawl 576 into engagement with the tooth on wheel 382 to move memory No. 2 ahead from the tenth frame position to the eleventh frame position.

If no strike or spare is made in the tenth frame, the memory No. 2 stays in the tenth frame position and switch 401 disconnects the turret indexing solenoid 102. All scoring is as described above for each ball. When print hammer 283 prints team subtotal or team total, it engages and closes a switch 624 (FIG. 13A) to actuate solenoid 102 and index the turret to the next player's position.

If a strike or spare is made in the tenth frame, pawl 575 or 576 immediately advances the memory No. 2 to the eleventh frame position and switch 402 disconnects solenoid 102, opens a switch in series with switch 486 to block or open the extras circuit, and opens a switch to disconnect print solenoid 287. If a spare has been made, after the next subsequent ball is bowled, a cam 626 (FIGS. 9 and 10c) on shaft 92 is timed to trip a switch 628, which, through a closed contact of switch 402, energizes a solenoid 630 (FIG. 9) to pull a link 632 and pivot a pusher 634 on pin 635 into engagement with bumps 390a and 390b on disc 390 to advance disc 390 and the memory No. 2 to the thirteenth frame position. In the thirteenth frame position, switch 401 closes a contact in series with switch 622 so that when switch 622 closes during revolution of shaft 92, team total printing results as described above.

If a second strike is made, pawl 575 immediately advances memory No. 2 to the twelfth frame position and switch 403 disconnects solenoid 102, extras solenoid 485, print solenoid 287 and print solenoid 286. After any printing of ball score by solenoid 285, switch 628 is actuated by cam 626 on shaft 92 through a contact closed by switch 403, to energize solenoid 630 to pull link 632 and pivot pusher 634 to engage bump 390b on disc 390 and advance the memory No. 2 to the thirteenth frame position where switch 401 is closed and printing of team subtotal or team total will be effected as described above.

TIMED OPERATION

The sequence of events for properly scoring a bowling game will be apparent to those in the art from the descriptions herein. The sequence should be timed in order to provide the proper operation. In the illustrated embodiment, much of the timing can be obtained from shaft 92 and the cams mounted thereon. As an example of such timing, for normal first through ninth frame operation, at the beginning of the cycle the information with respect to pin-count is available since the ball has been thrown. The information is fed into the first and second ball wheels and any strike or spare detection is effected. The ball-thrown signal from the pit indexes the turret to bring the proper bowler's memory system into register at the proper station with the remainder of the score device. A signal from the pin setter causes shaft 92 to begin to rotate. During approximately the first 90 degrees of rotation, the carriage moves the scorecard from the projection position to the print position. Then, at about 120 degrees cam 520 closes switch 521 to cause printing of ball score, followed by indexing of the spider, e.g. at about 135 degrees, if cumulative score is to be printed. For printing cumulative score, cam 540 permits selection of the cumulative score print hammers, e.g. at about 150–210 degrees of rotation of shaft 92. The spider, if it has been indexed, is reset and the carriage returns the scorecard to projection position at the end of the cycle of shaft 92, e.g. from 270–360 degrees.

During the tenth frame, the cycle is generally the same except that during selection of cumulative score hammers certain hammers are blocked by switch 402 or 403 as appropriate to prevent unwanted printing in the current frame or one frame back. As the carriage returns, e.g. at about 355 degrees, switch 628 closes to reset the frame memory, as required, to position number 13 to prepare for printing team total. Team total printing is effected in the described form during a separate subsequent cycle of shaft 92 so that the carriage can reapproach the higher step of the frame memory at the 13th position of the frame memory. For cycling shaft 92, switch 79 is manually depressed, and the card positioning and cycle control by shaft 92 is thereby started. However, there is no first or second ball score to be printed at this time and at 180 degrees switch 622 closes to cause printing of team totals. The turret will then index so the next player's team subtotal can be printed.

We claim:

1. An apparatus for scoring bowling games for a plurality of players comprising
    (a) a frame,
    (b) means mounted on said frame at a print station for printing score information on a scorecard,
    (c) means mounted on said frame at a projection station for projecting printed score information from the scorecard,
    (d) means for moving the scorecard between print and projection stations,
    (e) turret means mounted on said frame for rotation relative to said printing station,
    (f) separate memory means for each bowler mounted on and carried by said turret means for individual association with said printing means at said print station as the turret is rotated to carry the respective memory means to said print station for transfer of information to a scorecard at said print station, and
    (g) drive means for driving said turret means for successively indexing each of said memory means to said print station.

2. The device of claim 1 wherein each of said memory means includes means for storing the history of a bowler during bowling of a game.

3. The device of claim 2 wherein said history storing means comprises a plurality of cams operatively positioned relative to each other having concentric centers and affixed together and mounted on an axis to form a rotatable cylinder, each cylinder retaining the individual history of a player by virtue of its angular disposition about said axis.

4. An apparatus for scoring bowling games for a plurality of players, comprising
    (a) a frame,
    (b) indexable turret means mounted on said frame for rotation,
    (c) separate adjustable accumulator memory means for each bowler mounted on and carried by said turret means for storing numerical score for a respective bowler,
    (d) separate frame memory means for each bowler mounted on and carried by said turret means for indicating the frame in which the respective bowler is bowling,
    (e) separate mark memory means for each bowler mounted on and carried by said turret means for storing the bowler's spare and strike history,
    (f) means mounted on said frame defining a score receiving and printing station for receiving score information and entering the score information into said accumulator means, and for printing said score information from said accumulator means,
    (g) means mounted on said frame defining a frame readout station including means for detecting the frame in which a bowler is bowling for controlling said printing means to print the accumulated score in the proper frame of a scoresheet,
    (h) means mounted on said frame defining a mark readout station including means for detecting mark history from said mark memory for controlling the printer to print in frames of the scoresheet prior to the current frame, and
    (i) drive means for indexing said turret means to carry the mark memory, frame memory and accumulator memory for any one bowler concurrently to a position registering with said mark readout station, said frame readout station and said receiving and printing station respectively.

5. The apparatus of claim 4 wherein said drive means includes means for indexing the turret means to carry all memories for each bowler seriatim to said respective stations.

6. An apparatus for storing score values for a plurality of bowlers bowling as a team during a game of bowling, which apparatus comprises a separate storage means for each bowler for storing the bowler's cumulative score, a separate storage means for each bowler for storing team total score, means mounting all of the team total storage means as a series, means for introducing a bowler's earned score values into both the cumulative score storage means and the team total storage means for the respective player, and means responsive to introduction of score values into any one of said team total storage means and linking said team total storage means in series for introducing score values into each subsequent team total storage means of said series.

7. In an apparatus for scoring bowling games in which extra pin count is awarded to a player upon occurrence of a predetermined strike or spare condition,
    (a) a frame,
    (b) movable means mounted for movement relative to said frame in one direction and return,
    (c) means for receiving pin count information for moving the movable means in said one direction an amount representative of the pin count,
    (d) means for returning the movable means,
    (e) storage means for storing the bowler's accumulated score,
    (f) means for detecting movement of the movable means in each direction and for introducing the represented pin count into said storage means,
    (g) means normally blocking said detecting means during return movement of said movable means, and
    (h) means for unblocking said blocking means during return movement of said movable means responsive to occurrence of a predetermined strike or spare condition.

8. The apparatus of claim 7 wherein said movable means is a second ball member and said receiving and moving means comprises means for receiving the total first and second ball pin count of a frame and moving the movable member the amount representative of total first and second ball pin count and said unblocking means is responsive to occurrence of a strike condition.

9. The apparatus of claim 8 including means responsive to occurrence of said strike condition for introducing a bonus pin count of ten into the bowler storage means.

10. The apparatus of claim 7 wherein said movable means is a first ball member and said receiving and moving means comprises means for moving said first ball member an amount representative of first ball pin count and wherein said unblocking means is responsive to a predetermined spare condition.

11. The apparatus of claim 7 wherein said movable means comprises separate first and second ball members and including separate means for detecting movement of each of said members to a pin count of ten, a mark memory for storing strike and spare conditions for the bowler, mechanical means for introducing a strike into said mark memory responsive to movement of said first ball member to a pin count of ten, and mechanical means for introducing a spare into said mark memory responsive to movement of said second ball member to a pin count of ten.

12. An apparatus for scoring bowling games for a plurality of players comprising: a frame, turret means mounted on said frame for rotation relative to said frame and indexable about an axis, separate memory means for receiving score information for each bowler mounted on said turret means to be carried by said turret means to a print station, means mounted on said frame for printing score information from said memory means at said print station, and drive means for driving said turret means for indexing each of said memory means to said printing means for individual association with said printing means at said print station for printing of information by said printing means, each of said separate memory means carrying printing type for printing score information for the bowler and said printing means comprising hammers for driving a score card against said memory means to print score information on the score card from said type.

13. The apparatus of claim 12 wherein each of said separate memory means comprises a set of accumulator number wheels carrying said printing type for printing by said hammers and includes wheel means for printing first ball score and separate wheel means for printing second ball score.

14. In an apparatus for scoring bowling games for a plurality of players, a memory system comprising a rotatable turret, a plurality of individual player memories mounted on said turret, means defining an input for delivering score information to said memories, means defining an output for delivering score information from said memories, means for indexing said turret relative to said input means and output means to register each of said player memories sequentially with said input means and output means, and means for supporting a score sheet, each of said player memories comprising a plurality of accumulator number wheels including printing type and mounted for individual rotation about an axis, said input means including means for adjusting the rotational disposition of said wheels, and said output means including means for driving one of said plurality of number wheels and said score sheet supporting means toward the other to print upon the surface of a score sheet carried by said score sheet supporting means.

15. The apparatus of claim 14 wherein said turret includes a longitudinal shaft forming the axis of said turret and a plurality of discs secured to said shaft in a plane normal to said shaft for rotation with said shaft, said accumulator number wheels being rotatably mounted on said discs and said indexing means being operatively connected for driving said shaft.

16. In an automatic scoring machine for providing printable scores for a plurality of players, a memory section comprising drive means, a first shaft adjacent said drive means, a transmission between said drive means and said first shaft for rotating said first shaft, a one-revolution clutch on said first shaft, control means for activating said one-revolution clutch, a second shaft axially aligned with said first shaft, said second shaft driven by said one-revolution clutch, a rotatable turret on said second shaft, a Geneva motion mechanism for limiting the rotation of said turret, a plurality of turret plates affixed to said second shaft and mounted in a plane normal to said second shaft, a plurality of score memory means, one for each player, operatively mounted on said turret plates for retaining player scores and providing a printable player score output, a plurality of player history memory means, one for each player, operatively mounted on said turret plates for retaining the individual history of a player and designating a printing position for the printable player score output, and means driven by said second shaft for activating said one-revolution clutch control means thereby causing indexing of said turret an amount limited by said Geneva motion mechanism.

17. An apparaus for scoring bowling games for a plurality of players comprising means for receiving pin count information, separate cumulative score storing and printing means for each bowler, means for introducing pin count information from said receiving means to a preselected one of said cumulative score storing and printing means, common means for printing first and second ball pin count for said bowlers, and means for entering pin count on a ball-by-ball basis from said receiving means to said common means.

18. The apparatus of claim 17 including means for supporting a scoresheet, means mounting said printing means and said scoresheet support for relative movement with respect to each other, means for imparting relative movement to said printing and support means for registering a selected bowler's line and frame on the scoresheet with said common printing means, means delivering the cumulative score storing and printing means for said selected bowler to said scoresheet, and means for thereafter registering the selected bowler's line and frame on the scoresheet with the delivered cumulative score storing and printing means.

19. An apparatus for printing scores of a bowling game for a plurality of players comprising means for receiving and supplying pin count information, separate cumulative score printing means including a set of printing type for each bowler, means for setting printing type in a selected one of said separate printing means responsive to pin count information from said receiving means, common means including a common set of type for printing first and second ball pin count for all of said bowlers, and means for setting the type in said common means on a ball-by-ball basis responsive to pin count from said receiving means.

20. An apparatus for scoring bowling games for a plurality of players, each game for each player comprising a plurality of successive bowling frames, comprising: a frame, means for handling score information, including pinfall information receiving means, mounted on said frame and defining a stop station, turret means mounted on said frame for rotation relative to said handling means and indexable about an axis adjacent said handling means, separate memory means for each bowler mounted on and carried by said turret means for individual association of each memory means with said handling means as the turret is indexed to carry the memory to said stop station for transfer of information between the memory means and handling means, and drive means for driving said turret means for successively indexing each of said memory means to said handling means and stopping the memory means at said stop station, and further including means for entering information from said receiving means into said bowler memories at said stop station comprising pawl means for operating said bowler memories to advance one unit for each actuation, means for operating said pawl means once responsive to each pin count received by said receiving means, means for actuating said operating means one additional time for each pin count earned on a first ball following a spare responsive to a spare condition, means for actuating said operating means one additional time for each pin count earned on the first and second balls following a strike responsive to a strike condition, means for actuating said operating means ten additional times responsive to occurrence of a strike condition, and means for overriding all of said actuating means responsive to a strike or spare in the last frame of a bowling game.

21. An apparatus for scoring bowling games for a plurality of players, each game for each player comprising a plurality of successive bowling frames, comprising:
 (a) a frame,
 (b) means for handling score information mounted on said frame and defining a stop station,
 (c) turret means mounted on said frame from rotation relative to said handling means and indexable about the axis adjacent said handling means,
 (d) separate memory means for each bowler mounted on and carried by said turret means for individual association of each memory means with said handling means as the turret is indexed to carry the memory means to said stop station for transfer of information between the memory means and handling means, and each of said memory means comprising accumulator number wheel means including three sets of three-wheel number discs and a set of four-wheel number discs mounted for rotation for accepting and retaining the score of one player, and
 (e) drive means for driving said turret means for successively indexing each of said memory means to said handling means and stopping the memory means at said stop station.

22. An apparatus for scoring bowling games for a plurality of players comprising a frame, carriage means mounted for movement relative to said frame, separate bowling game frame memory means for each bowler mounted on said carriage for movement relative to the carriage to separate positions corresponding to the separate frames of the bowling game, means mounted on said frame and defining a bowling game frame detecting station for detecting the bowling game frame of a bowler stored in said memory means, means for moving said carriage to bring said memory means to said detecting station and return, and means responsive to movement of said cariage for advancing said memory means one unit to the next bowling game frame, said memory comprising a stepped cam having a step of a different height for each frame of the bowling game and wherein said detecting means comprises a feeler for feeling the height of said step, said apparatus including printing means for printing bowling scores and control means responsive to said feeler means for positioning said printing means relative to a scoresheet for printing in the proper frame on the scoresheet.

23. An apparatus for scoring bowling games for a plurality of players, comprising: a frame, turret means mounted on said frame for rotation relative to said frame and indexable about an axis, separate memory means for receiving score information for each bowler mounted on said turret means to be carried by said turret means to a print station, means mounted on said frame for printing score information from said memory means at said print station, and drive means for driving said turret means for indexing each of said memory means to said printing means for individual association with said printing means at said print station for printing of information by said printing means, said printing means including carriage means for supporting a score card, means mounting said carriage means for movement in separate realtively transverse directions and means for moving said carrage at said print station for registering said score card with said memory means and printing means for receiving printed score information in proper areas of the score card, and projection means defining a projection station for receiving said carriage and for projecting score information from a score card supported by said carriage, and wherein said mounting means mounts said carriage for movement between said print station and said projection station and said moving means is adapted for moving said carriage between said stations.

References Cited
UNITED STATES PATENTS

| | | | |
|---|---|---|---|
| 1,284,405 | 11/1918 | Marshall | 235—60 |
| 2,374,760 | 5/1945 | Lindstein | 235—60 X |
| 3,124,355 | 3/1964 | Mentzer et al. | 273—54 |
| 3,295,438 | 1/1967 | Webb et al. | |
| 3,295,849 | 1/1967 | Miller et al. | 273—54 |

ANTON O. OECHSLE, *Primary Examiner.*

U.S. Cl. X.R.

88—24; 101—100; 235—60, 92; 346—134